(12) United States Patent
Fayyad

(10) Patent No.: US 10,749,620 B2
(45) Date of Patent: Aug. 18, 2020

(54) PROVISIONING A SERVICE FOR CAPTURING BROADCAST CONTENT TO A USER DEVICE VIA A NETWORK

(71) Applicant: Music Pocket, LLC, Columbia, SC (US)

(72) Inventor: Mazen Anees Fayyad, Mount-Lebanon (LB)

(73) Assignee: Music Pocket, LLC, Columbia, SC (US)

( * ) Notice: Subject to any disclaimer, the term of this patent is extended or adjusted under 35 U.S.C. 154(b) by 0 days.

(21) Appl. No.: 16/430,897

(22) Filed: Jun. 4, 2019

(65) Prior Publication Data

US 2019/0305863 A1    Oct. 3, 2019

Related U.S. Application Data

(63) Continuation of application No. 15/506,078, filed as application No. PCT/US2015/046646 on Aug. 25, 2015, now Pat. No. 10,355,797.

(Continued)

(51) Int. Cl.
*H04H 60/45* (2008.01)
*H04H 60/37* (2008.01)
(Continued)

(52) U.S. Cl.
CPC ........... *H04H 60/45* (2013.01); *G06Q 20/123* (2013.01); *G06Q 30/0253* (2013.01);
(Continued)

(58) Field of Classification Search
CPC ...... H04H 60/45; H04H 60/372; H04H 60/63; H04H 60/33; H04H 60/46; H04H 60/51;
(Continued)

(56) References Cited

U.S. PATENT DOCUMENTS 7,848,720 B2   12/2010  Tan
8,321,534 B1   11/2012  Roskind et al.
(Continued)

FOREIGN PATENT DOCUMENTS

WO   2014062641   4/2014
WO   2014137908   9/2014
WO   2016022007   3/2016

OTHER PUBLICATIONS

Proquest Newsstand Professional; "Music Week"; Magazine—Periodical; published Feb. 17, 2007; Media; London; United Kingdom.

(Continued)

*Primary Examiner* — Shaima Q Aminzay
(74) *Attorney, Agent, or Firm* — Haynsworth Sinkler Boyd, P.A.

(57) ABSTRACT

A server device that communicates with a user device and the server device is enabled to receive a request for a copy of content, the request including a first identifier associated with the content, information associated with the user device, and information associated with a broadcast station that is broadcasting the content. The server device may obtain a user profile associated with the user device and obtain a station profile associated with a broadcast station, and identify the content, in the station profile. The server device may obtain the copy of the content to enable the user device to access the copy of the content and send, to the user profile, a notification indicating that the user device is authorized to access to the content.

25 Claims, 20 Drawing Sheets

Related U.S. Application Data

(60) Provisional application No. 62/041,392, filed on Aug. 25, 2014.

(51) Int. Cl.
    *H04H 60/63* (2008.01)
    *G06Q 20/12* (2012.01)
    *G06Q 30/02* (2012.01)
    *H04H 60/33* (2008.01)
    *H04H 60/46* (2008.01)
    *H04H 60/51* (2008.01)
    *H04H 60/66* (2008.01)

(52) U.S. Cl.
    CPC ..... *G06Q 30/0261* (2013.01); *G06Q 30/0267* (2013.01); *G06Q 30/0269* (2013.01); *H04H 60/372* (2013.01); *H04H 60/63* (2013.01); *H04H 60/33* (2013.01); *H04H 60/46* (2013.01); *H04H 60/51* (2013.01); *H04H 60/66* (2013.01); *H04H 2201/37* (2013.01)

(58) Field of Classification Search
    CPC .... H04H 60/66; H04H 2201/37; H04H 60/18; G06Q 20/123; G06Q 30/0253; G06Q 30/0261; G06Q 30/0267; G06Q 30/0269; G06Q 20/405
    USPC ......................................................... 455/3.01
    See application file for complete search history.

(56) References Cited

U.S. PATENT DOCUMENTS

| | | | |
|---|---|---|---|
| 8,676,135 B2 | 3/2014 | Hong et al. | |
| 10,355,797 B2 * | 7/2019 | Fayyad | G06Q 20/405 |
| 2005/0182792 A1 | 8/2005 | Israel et al. | |
| 2005/0197906 A1 | 9/2005 | Kindig et al. | |
| 2006/0128301 A1 | 6/2006 | Dorfstatter et al. | |
| 2006/0218613 A1 | 9/2006 | Bushnell | |
| 2006/0253874 A1 | 11/2006 | Stark et al. | |
| 2007/0036086 A1 | 2/2007 | Walter et al. | |
| 2007/0124044 A1 | 5/2007 | Ayoub et al. | |
| 2007/0204301 A1 | 8/2007 | Benson | |
| 2007/0283008 A1 | 12/2007 | Bucher et al. | |
| 2008/0092181 A1 | 4/2008 | Britt | |
| 2008/0114664 A1 | 5/2008 | Harb | |
| 2008/0271090 A1 | 10/2008 | Fortunato | |
| 2009/0023406 A1 | 1/2009 | Ellis et al. | |
| 2009/0307335 A1 | 12/2009 | Bantz et al. | |
| 2010/0205166 A1 | 8/2010 | Boulter et al. | |
| 2010/0279629 A1 | 11/2010 | Srinivasan et al. | |
| 2011/0107096 A1 | 5/2011 | Je | |
| 2011/0191179 A1 | 8/2011 | Linietsky et al. | |
| 2011/0265185 A1 | 10/2011 | Lewis et al. | |
| 2011/0271294 A1 | 11/2011 | Del Beccaro et al. | |
| 2011/0320259 A1 | 12/2011 | Roumeliotis et al. | |
| 2012/0023188 A1 | 1/2012 | Martin | |
| 2012/0079010 A1 | 3/2012 | Song | |
| 2012/0108266 A1 | 5/2012 | Clark et al. | |
| 2012/0159535 A1 | 6/2012 | Gratton et al. | |
| 2012/0266076 A1 | 10/2012 | Lockhart et al. | |
| 2013/0117468 A1 | 5/2013 | Lbasco et al. | |
| 2013/0124006 A1 | 5/2013 | Anantha et al. | |
| 2013/0225299 A1 | 8/2013 | Lockton | |
| 2013/0254159 A1 | 9/2013 | Thramann et al. | |
| 2013/0298155 A1 | 11/2013 | Stepanov | |
| 2013/0304689 A1 | 11/2013 | Faenger et al. | |
| 2013/0317937 A1 | 11/2013 | Dunning et al. | |
| 2014/0033238 A1 | 1/2014 | Jeon et al. | |
| 2014/0046775 A1 | 2/2014 | Harb | |
| 2014/0101682 A1 | 4/2014 | Schlager et al. | |
| 2014/0187267 A1 | 7/2014 | Yang et al. | |
| 2014/0258292 A1 | 9/2014 | Thramann et al. | |
| 2018/0227066 A1 | 8/2018 | Fayyad | |

OTHER PUBLICATIONS

Gale Group; "Radiolicious app makes the iPhone sound so good"; Magazine—Journal; published Oct. 24, 2008; p. 15(1), Issue 609; Rider Research, Inc.; United States.

Clip Interactive; "We make audio content digitally interactive", 2015 Clip Interactive, LLC.

WO2014137908, International Search Report dated Jul. 17, 2014.

WO2016033007, International Search Report and Written Opinion dated Nov. 24, 2015.

* cited by examiner

PROVISIONING A SERVICE FOR CAPTURING BROADCAST CONTENT TO A USER DEVICE VIA A NETWORK

BACKGROUND

Computing and communication devices are capable of performing an increasing variety of functions and tasks that continue to improve the user's experience. For example, computing and communication devices can run a variety of applications, can connect to a variety of wired and wireless networks to receive services, can access a variety of services and/or perform various functions associated with ecommerce, point of sale transactions, social networking, downloading and uploading content, sending and receiving messages, etc.

These computing and communication devices (e.g., a smartphone, a tablet computer, home computer, laptop computer, automobile-based user device, server etc.) do not permit a user to download, purchase, or capture content that is being broadcast from a broadcast station via a particular broadcast channel, and received and/or played on, for example, an automobile stereo, a portable stereo, a home stereo system, a television, etc. (hereinafter, sometimes collectively referred to as a "audio/video device").

SUMMARY

A server device that communicates with a user device associated with a user, where the user device receives content information associated with content that is broadcasted by a broadcast station, the server device including one or more processors executing instructions to receive, from the user device, a request for a copy of the content, the request including a first identifier associated with the content, information associated with the user device, and information associated with the broadcast station. The one or more processors may obtain a user profile associated with the user device by matching the information associated with the user device to first information stored in the user profile, obtain a station profile, associated with the broadcast station, by matching the information associated with the broadcast station to second information stored in the station profile. The one or more processors may identify the content, in the station profile, by matching the first identifier to a second identifier, associated with the content stored in the station profile and obtain the copy of the content to enable the user device to access the copy of the content based on the identifying the content in the station profile. The one or more processors may send, to the user profile, a notification indicating that the user device is authorized to access to the content.

A method performed by a server device, executing one or more instructions, that communicates with a user device associated with a user, where the user device receives content information associated with content that is broadcasted by a broadcast station, the method including receiving, by the server device from the user device, a request for a copy of the content, the request including a first identifier associated with the content, information associated with the user device, and information associated with the broadcast station, obtaining, by the server device, a user profile associated with the user device by matching the information associated with the user device to first information stored in the user profile, and obtaining, by the server device, a station profile, associated with the broadcast station, by matching the information associated with the broadcast station to second information stored in the station profile. The method may further include identifying, by the server device, the content, in the station profile, by matching the first identifier to a second identifier, associated with the content stored in the station profile, obtaining, by the server device, the copy of the content to enable the user device to access the copy of the content based on the identifying the content in the station profile and sending, by the server device to the user profile, a notification indicating that the user device is authorized to access to the content.

A system including one or more user device, executing one or more instructions to receive content information associated with content broadcasted by a broadcast station. The system may also include one or more server devices, executing one or more instructions, to receive, from the user device, a request for a copy of the content, the request including a first identifier associated with the content, information associated with the user device, and information associated with the broadcast station. The one or more server devices may obtain a user profile associated with the user device by matching the information associated with the user device to first information stored in the user profile, obtain a station profile, associated with the broadcast station, by matching the information associated with the broadcast station to second information stored in the station profile and identify the content, in the station profile, by matching the first identifier to a second identifier, associated with the content stored in the station profile. The one or more server devices may obtain the copy of the content to enable the user device to access the copy of the content based on the identifying the content in the station profile and send, to the user profile, a notification indicating that the user device is authorized to access to the content.

A server device that communicates with a user device associated with a user, the server device including one or more processors executing instructions to receive, from the user device, a request to access program information associated with a broadcast station, the request including information associated with the user device and information associated with the broadcast station, the program information including information associated with content currently broadcasted by the broadcast station, information associated with content previously broadcasted by the broadcast station, and information associated with content that is to broadcasted by the broadcast station in the future. The one or more processors may obtain a user profile, associated with the user device, by matching the information associated with the user device to first information stored in the user profile and obtain a station profile, associated with the broadcast station, by matching the information associated with the broadcast station to second information stored in the station profile. The one or more processors may grant the user device access to the program information and receive a request for a copy of an arrangement of content that includes one or more first identifier associated with content included in the program information. The one or more processors may identify the arrangement of content, in the station profile, by matching the one or more first identifier associated with the arrangement of content to one or more second identifier associated with the arrangement of content that is stored in the station profile and obtain a copy of the arrangement of content to enable the user device to access the copy of the arrangement of content based on the identifying the arrangement of content in the station profile. The one or more processors may send, to the user profile, a notification that the user device is authorized to access the arrangement of content.

DESCRIPTION

Figure 1:
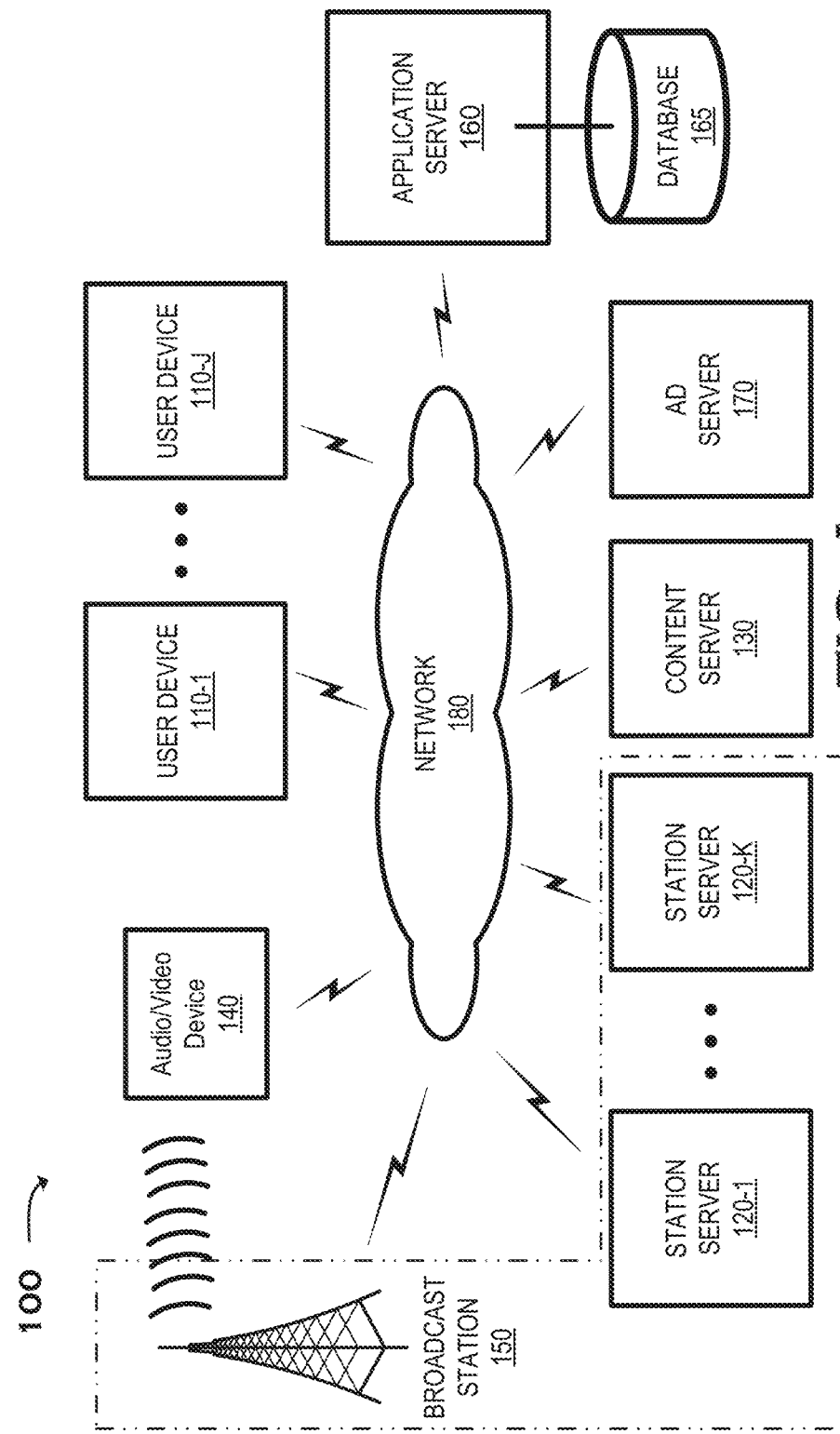
FIG. 1 is a diagram of an example environment in which the systems, methods, apparatus, technologies, and/or techniques, described herein, may be implemented.

The systems, methods, technologies, and/or techniques (hereinafter, the "systems and/or methods") may enable a user, of a user device, to capture, download, purchase, lease, rent, obtain, etc. (hereinafter, "capture") to the user device, content that is being broadcast (from a broadcast station), and received and/or played on a media player associated with the user. The term broadcast, as used herein, may include unicast, multicast, broadcast, transmitting, streaming, downloading, and/or otherwise sending any information or content over any wired, wireless and/or over-the-air medium. The term content may include, without limitation, music, audio content, video content, images, text, or advertising content. The term broadcast station or station may include a radio station (e.g., over an amplitude modulation (AM) broadcast channel, a frequency modulation (FM) broadcast channel, a high definition (HD)/digital radio (DR) channel, etc.), a television station (e.g., over a television broadcast channel), an internet radio (e.g., streaming media broadcast channel), a satellite radio (e.g., SiriusXM® satellite radio broadcast channel), etc.

The systems and/or methods may enable the user device to communicate with an audio video device to obtain information and/or metadata associated with the content (hereinafter, "content information") that is obtained (e.g., by the audio video device) from content that is being broadcast. The systems and/or methods may enable the user device to display the content information to enable the user to identify the content and/or to determine whether to capture a copy of the content. In the event the user desires to capture the content, the systems and/or methods may enable the user to select a single button on the user device to cause the copy of the content to be captured (e.g., to a user device) from an application server and/or station server via a network (e.g., the Internet or some other public or private network).

The systems and/or methods may enable the user device to communicate with the audio/video device to identify a particular a channel associated with a broadcast (e.g., FM station, AM station, television station, unicast/multicast/broadcast frequency band, satellite band, uniform resource locator (URL), etc.) (hereinafter "channel information") over which the content is being broadcast and/or received by the audio/video device. The systems and/or methods may enable the user device to provide the channel information to the application server to enable the application server to identify the broadcast station from which the content is being broadcast. The systems and/or methods may also enable the user device to provide, to the application server, information that identifies a location of the user device (e.g., geographic area, coordinates, municipality, city, station, region, province, country, continent, etc.) (hereinafter, "location information") to enable the application server to identify and/or select from two or more broadcast stations within a geographical area (e.g., a country, a state, etc.) that share the same or similar broadcast channel.

The systems and/or methods may enable the application server to create a station profile associated with a broadcast station (and/or a server associated with the broadcast station which is hereinafter referred to as a "station server") and a user profile associated with the user device. The systems and/or methods may enable the station server to provide program information to the application server to be associated with the station profile. The program information may identify the station server, the broadcast channel (e.g., FM channel, television channel, broadcast frequency, URL, etc.), a schedule that identifies content previously broadcast, currently being broadcast and/or to be broadcast at a future time, broadcast coverage area or location, and/or other program information associated with the broadcast station. The station server may from time to time provide updated program information to enable to the application server to continuously and/or dynamically update the station profile over time based on the program information and/or captured content identified in the station profile. The application server may use the station profile and/or the user profile to manage and respond to request for content received from user device.

For example, the systems and/or methods may enable the application server to receive a request, from the user device, to capture content being broadcast by a broadcast station. In one non-limiting example, the application server may access the station profile to select, from the program information, an identifier associated with the requested content and may associate the identifier with the user profile to cause the content to be downloaded, from the application server or some other server, to the user device. The application server may process a bill and/or payment, associated with an account and/or award points (as further described herein) of a user of a user device, as a result of the capture of the content. For example, the bill may be based on a capture of the content (e.g., when the user device receives a permanent copy of the content) and/or a lease of the content when the user device receives a copy of the content for a specific time period or a period associated with a subscription and has the option to pay additional amount to extend the time period or capture a permanent copy. Additionally, or alternatively, the content may be captured for the time period of a particular session (e.g., free of charge or for a subscription fee) after which the content is removed from the user profile and/or is no longer accessible to the user device unless again captured as described herein.

The systems and/or methods may enable the application server to also, or alternatively, store information in the station profile, that indicates that the content was captured and may track and/or manage a quantity or total cost of captured content, associated with the broadcast station, that enables the broadcast station to participate economically in the transactions involving captured content by, for example, receiving a portion of the payment price and/or proceeds from application server. Additionally, or alternatively, the user device may communicate directly with the station server to request the content and the station server may communicate with the application server to provide the content to the user device (e.g., using the profile scheme described above). Additionally, or alternatively, the application server may provide a copy of the content to the station server for download to the user device.

The systems and/or methods may enable the application server to manage and/or control the user profile to track and/or store information associated with a current or prior session. For example, the user profile may include information that identifies a history of broadcast content (e.g., including time, date, radio station, station server, etc.) that was captured by the user device during a current session and/or a prior session. The user may use the user device to access the user profile via the application server. The user may select content to capture to the user device and/or a different user device specified by the user. The user may also, or alternatively, access another user profile associated with another user to capture content identified in another user profile associated with another user. In this example, the other user may be prompted to authorize the user device to access the other user's user profile.

The user may also, or alternatively, use the user device to communicate with a station server and/or application server to pre-order a list and/or arrangement of content to be broadcast to the public (e.g., an unspecified quantity of user devices and/or audio/video systems). Additionally, or alternatively, the arrangement may be ordered as unicast content to be transmitted to the user device or some other user device specified by the user at a particular time and/or a specified time period (e.g., during a party, during hours of operation of a restaurant or nightclub, etc.). Additionally, or alternatively, the arrangement may be ordered as multicast content to be transmitted to two or more user devices specified by the user. In these examples, the arrangements may be stored, by the application server, in the user profile. The user device may communicate with the application to capture some or all of the arrangement at a time convenient to the user.

The systems and/or methods may enable the application server to create copies of the content, may process the copy to ensure that the copy is supported by the particular type of user device (e.g., by transcoding, compressing, encoding, decoding, converting data format based on aspect ratio or frame rate, etc.). The application server may also, or alternatively, communicate with a server associated with content provider (hereinafter, a "content server") to obtain one or more copies of the content. Obtaining copies of the content may be pursuant to a license agreement that enables the application server to make copies, process the content, download the content, advertise the content, etc. The application server may obtain a key from the content server that enables the content to be encrypted, decrypted, etc. The application server may provide a key to the user device that enables a copy of encrypted content to be decrypted and/or played on the user device.

The systems and/or methods may enable the application server to provide analytics (e.g., raw data, analyzed data, patterns, statistics, etc.) to station servers based on a quantity of captures and/or revenue received in connection therewith, for example, over time and/or relative to other broadcast stations, as further described herein.

The systems and/or methods may enable a user device to communicate with the application server and/or station server to dedicate content to a user of another user device. The systems and/or methods may enable the application server and/or station server to provide advertising content to the user based on the user profile which may identify the user's favorite content genres, prior captures, subscription level, quantity of content points (described below), etc.

The systems and/or methods may enable the user device to select and/or obtain advertising content (hereinafter, "ad content") from content being broadcast from a station, from an application server and/or another server and/or select ad content, for example, by selecting a particular button on the user device (e.g., a keyboard button, touching a button on the user interface, etc.). Selection of the ad content may cause the application server, station server, and/or a content server to provide such content that can be displayed on the user device. Displaying such content may enable the user to interact with the displayed ad content to view and/or select for capture goods or services associated with the ad content (hereinafter, "items") to capture. Such a capture may be accomplished when the user device provides payment information to the application server and/or when the user device specifies that content points and/or content currency (described below) are to be used to pay for the selected goods and/or services. In one example, the station server and/or application server may transmit a bar code, quad code, etc. that can be printed and used to access an event (e.g., concerts, sporting events, etc.) and/or as discounts or credits to be applied to the capture of goods and/or services from a merchant by which the goods and/or services are being offered for sale.

The systems and/or methods may enable the application server to provide award points to the user profile when content is captured to the user device and/or ad content is viewed and/or goods or services are captured. The award points may be accumulated over time, purchased by the user (e.g., using a credit card, by paying an invoice or bill, etc.) and/or may be pre-charged and/or regenerated in a manner described herein. Such award points may be reflected in a bill that the user receives from a service provider (e.g., an Internet service provider, a broadband service provider, a cellular network service provider, etc.) and/or from that with which the application server is associated. The accumulation of award points can act as a virtual content currency that can be used to pay for captured content, pre-ordered arrangements of content, items associated with ad content, and/or to offset/reduce an amount of payment due that is reflected in the bill. The quantity of award points and/or currency may be tracked, managed, and/or updated by the application server over time as content and/or items are captured. For example, a user may, as described herein, interact with the ad content to capture items associated with the ad content using award points and/or via an electronic transaction using a credit card, bank account, or some other form of payment.

Additionally, or alternatively, a user may accumulate award points on a "loyalty" basis, for example, based on the quantity of time a user and/or user device is registered with an applications server, number of interactions with a registered broadcast station, entity, artist/author, the quantity of time a user and/or user device is within the vicinity of an entity registered with the application server, and/or logged into an application and/or website, as further described herein. Additionally, or alternatively, award points may be accumulated when a user purchases goods and/or servers from an entity that is registered with the application server. Additionally, or alternatively, the accumulation of a threshold number of award points may make the user eligible and/or entitled a reward (e.g., free content, discounts, coupons, additional award points, etc.). Rewards may be provided by, for example, a station server, content server, ad server, application server, and/or some other server. In one implementation, an entity and/or content provider may sponsor content broadcasted and/or provide rewards to user devices (e.g., free capture of content, etc.) during while the content is broadcasted.

The systems and/or methods may enable the application server and/or station server to provide a catalog of content that can be accessed by user device to permit content to be captured. The systems and/or methods may enable the application server to recommend one or more broadcast stations based on a location of the user device and/or user profile information (e.g., preferred genres). The user device and/or the application server may cause an audio video device with which the user is associated (e.g., in the users' car, truck, boat, etc. and/or on the user's person) to autotune to a particular broadcast station based on the location and/or user preferences as reflected in the user profile. The user device and/or application server may cause the audio video device to change to a different broadcast station based on a determination that the different broadcast station is broadcasting content that corresponds to a preferred genre, title, etc. as reflected in the user profile.

FIG. 1 is a diagram of an example environment 100 in which the systems and/or methods, described herein, may be implemented. As shown in FIG. 1, environment 100 may include one or more user device 110-1, . . . , 110-J (where J≥1) (hereafter referred to as "user device 110"), one or more station server 120-1, . . . , 120-K (where K≥1) (hereafter referred to as "station server 120"), one or more content server 130 (hereafter referred to as "content server 130"), one or more audio video device 140 (hereafter referred to as "audio video device 140"), one or more broadcast station 150 (hereafter referred to as "broadcast station 150"), one or more application server 160 (hereafter referred to as "application server 160"), one or more database 165 (hereafter referred to as "database 165"), one or more ad server 170 (hereinafter, referred to as "ad server 170") and a network 180. The number of devices, servers, databases, and/or networks, illustrated in FIG. 1, is provided for explanatory purposes only. In practice, there may be additional devices, servers, databases, and/or networks; fewer devices, servers, databases, and/or networks; different devices, servers, databases, and/or networks; or differently arranged devices, servers, databases, and/or networks than illustrated in FIG. 1 For example, environment 100 may additionally, or alternatively, include additional databases configured to store data. The one or more additional databases may be associated with any device, server, and/or network within environment 100. Each device, server, and/or network within environment 100 may be associated with a separate one or more database. For example, environment 100 may include one or more servers that act as a web server or some other type of server that hosts a web site that can be accessed by user device 110 and/or a different server. For example, one or more server may host a website associated with social networking (e.g., Facebook®, Myspace®, Twitter®, Flickr®, etc.), a business (such as, for example, content provider, a broadcast station, a night club, a restaurant, etc.), a service (e.g., a location service associated with user device 110 and/or other user devices 110), etc.

Also, in some implementations, one or more of the devices, databases, and/or servers of environment 100 may perform one or more functions described as being performed by another one or more of the devices, databases, and/or servers of environment 100. Devices, servers, and/or databases of environment 100 may interconnect via wired connections, wireless connections, or a combination of wired and wireless connections.

User device 110 may include any computation or communication device, such as a wireless mobile communication device, that is capable of communicating with network 130. For example, user device 110 may include a radiotelephone, a personal communications system (PCS) terminal (e.g., such as a smart phone that may combine a cellular radiotelephone with data processing and data communications capabilities), a personal digital assistant (PDA) (e.g., that can include a radiotelephone, a pager, Internet/intranet access, etc.), a laptop computer, a tablet computer, a personal computer, a camera, a personal gaming system, or another type of computation or communication device. In one example implementation, user device 110 may include a global positioning satellite (GPS) component that communicates with a GPS constellation to provide and/or obtain location information associated with user device 110. Additionally, or alternatively, user device 110 may include logic, such as one or more processing or storage devices, that can be used to perform and/or support processing activities on behalf of a user.

Additionally, or alternatively, user device 110 may include and/or be integrated with audio video device 140 and/or equipment such as an automobile stereo, a home entertainment system, a portable audio/video system, etc. User device 110 may be built in and/or included as an integral component of an automobile (e.g., including a car, motorcycle, truck, boat, train, etc.), such as an automobile entertainment system, information management system that is integrated into, for example, the dashboard, center console, etc. of the automobile. Such a system may enable the user (e.g., a driver) to interact with user device 110 (e.g., by select a particular button on user device 110, using a voice command, etc.) to perform one or more of the functions described herein, such as capturing or dedicating content and/or an arrangement of content.

User device 110 may further perform communication operations by sending data to or receiving data from another device, such as some other user device and/or server. Data may refer to any type of machine-readable information having substantially any format that may be adapted for use in one or more networks and/or with one or more devices. Data may include digital information or analog information. Data may further be packetized and/or non-packetized. User device 110 may include logic for performing computations on user device 110 and may include the components illustrated in FIGS. 2 and/or 3 in an example implementation.

User device 110 may host a copy of all or a portion of an application (described in greater detail in FIG. 5) to enable user device 110 to communicate with application server 160 (and other servers and components in environment 100) and/or to register and/or access services provisioned via application server 160. Additionally, or alternatively, user device 110 may access a website in order to access services provisioned by application server 160. User device 110 may enable a user to provide information associated with the user (as further described herein) to application server 160.

Station server 120 may include one or more computation or communication devices that gather, process, search, store, and/or provide information in a manner described herein. In one non-limiting example, station server 120 may be associated with a broadcast station such as, for example, radio station (e.g., over an amplitude modulation (AM) broadcast channel, a frequency modulation (FM) broadcast channel, a high definition (HD)/digital radio (DR) channel, etc.), a television station (e.g., over a television broadcast channel), an internet radio (e.g., streaming media broadcast channel), a satellite radio (e.g., SiriusXM® satellite radio broadcast channel), etc.). In other non-limiting examples, station server 120 and/or another server, as described herein, may be associated with an entity and/or artist/author other than a broadcast station, including for example, restaurants, night club, bars, hotels, halls, venues, band, artist, author, disc jockey, orchestra, symphony, chorus, group and/or any establishment (public or private), individual, or group that broadcasts and/or plays content. Station server 120 may access application server 160, for example, to register, provide content, and/or provide information associated with a broadcast station. Station server 120 may also, or alternatively, enable a broadcast station to provide or modify content and/or information associated with a broadcast station, identify which content and/or information may be shared with other servers and/or devices, and receive analytics, as further described herein. Station server 120 may host a copy of all or a portion of an application to enable station server 120 to communicate with application server 160, as described herein. Station server 120 may be included and/or integrated with a broadcast station 150 and/or station server 120 and broadcast station 150 may be included in a system associated with broadcast station 150.

Content server 130 may include one or more computation or communication devices that gather, process, search, store, and/or provide information in a manner described herein. In one example, content server 130 may be associated with a content provider that owns, licenses, or has access to content and/or content information and that desires to make such content and content information available to a user and/or station. Content server 130 may communicate with application server 160 to register and/or provide content and/or content information to application server 160, user device 110, and/or station server 120. Additionally, or alternatively, content server 130 (and/or another server) may provide a key to application server 160 that enables the content to be encrypted, decrypted, etc. Application server 130 may provide a key to user device 110 and/or station server 120 that enables a copy of encrypted content to be decrypted and/or played (e.g., on user device 110). Additionally, or alternatively, content server 130 may cause a payment (e.g., royalty, incentive payment etc.) to be paid to a station, artist, author, recording label, and/or any other rights holder, based on the capture of content. Additionally, or alternatively, content server 130 may be included in application server 160.

Audio video device 140 may include one or more computation or communication devices that receive and/or provide content and/or content information, in a manner described herein. In one example, audio video device 140 may be associated with a user. Additionally, or alternatively, audio video device 140 may be a component of, included in, and/or associated with user device 110. Audio video device 140 may include an automobile stereo, a portable stereo, a home stereo system, a television, etc.

Broadcast station 150 may broadcast any information or content over any wired, wireless and/or over-the-air medium. Broadcast station 150 may include a radio station (e.g., over an amplitude modulation (AM) broadcast channel, a frequency modulation (FM) broadcast channel, a high definition (HD)/digital radio (DR) channel, etc.), a television station (e.g., over a television broadcast channel), an internet radio (e.g., streaming media broadcast channel), a satellite radio (e.g., SiriusXM® satellite radio broadcast channel), etc. Broadcast station 150 may provide content and/or content information to audio visual device 140 and/or user device 110. Additionally, or alternatively, broadcast station 150 may be in communication with station server 120, content server 130, ad server 170, application server 160, and/or any other server and/or device within environment 100.

Application server 160 may include one or more computation or communication devices that gather, process, search, store, and/or provide information in a manner described herein. For example, application server 160 may host and/or execute an application (described in greater detail in FIG. 5) to provide content (and/or content information), ad content, services and/or perform operations associated therewith to user device 110, station server 120, content server 130, audio video device 140, and/or ad server 170, as described herein. Application server 160 may communicate with the devices, systems, and/or servers within environment 100 to register such devices and/or to provide and/or register a copy of an application that is compatible with and/or supported by different types of devices, systems, and/or servers. Application server 160 may authenticate user device 110, audio video device 140, and/or any of servers 120, 130, 170, to enable user device 110, audio video device 140, and/or any of servers 120, 130, 170, to access services, content, and/or ad content provided by application server 160. Application server 160 may enable user device 110, audio video device 140, and/or any of servers 120, 130, 170 to access application server 160 in a secure manner, for example, via an application programming interface (API) and/or a secure protocol (e.g., a tunneling protocol, a hypertext transfer protocol secure (HTTPS), a secure sockets layer (SSL), an Internet Protocol Security (IPsec), and/or some other secure protocol). Application server 160 may also, or alternatively, use such secure communications and/or protocols to automatically obtain (e.g., "pull") information from user device 110, audio video device 140, and/or any of servers 120, 130, 170 and/or from websites hosted by such servers, and/or to receive such information that is provided (e.g., "pushed") to application server 160 from user device 110, audio video device 140, and/or any of servers 120, 130, 170.

Application server 160 may communicate with user device 110 to obtain information associated with a user and/or user device 110 to create (and/or update) a user profile, as described in further detail herein. Application server 160 may communicate with station server 120 to obtain information associated with a broadcast station and/or station sever 120 (hereinafter, "station information") to create (and/or update) a station profile, as further described herein. Application server 160 may send and/or receive content and/or requests for content to and/or from user device 110, audio video device 140, and/or any of servers 120, 130, 170. Additionally, or alternatively, application server 160 may send ad content (and information associated with the items associated with the ad content) to and/or may receive ad content from user device 110, audio video device 140, and/or any of servers 120, 130, 170. Additionally, or alternatively, application server 160 may send an item (e.g., ticket, coupon, etc.) captured via ad content and/or confirmations associated therewith. Application server 160 may process payment associated with captured content and/or captured items associated with ad content. Application server 160 may access user and/or station profiles to male content available to user device 110 and/or another device and/or server. Application server 160 may send and/or receive requests to dedicate content and/or confirmations associated therewith.

Application server 160 may also, or alternatively, receive and/or process location information associated with user device 110 and/or a physical advertisement to determine a common geographic area, as further described herein. Application server 160 may receive and/or process location information associated with a user device and/or user profile information and/or make station recommendations and/or to automatically adjust ("autotune") the station received by audio video device 140 based, at least, on such information.

Application server 160 may also, or alternatively, receive and/or process input associated with a competition, determine the success and/or failure of the input in relation to the competition, and/or communicate the success and/or failure to user device 110 and/or station server 120. Application server 160 may analyze information sent to and/or received from user device 110, audio video device 140, and/or any of servers 120, 130, 170 to identify analytics associated with users, content, ad content, stations, etc. Additionally, or alternatively, application server 160 may provide award points to a user and/or user device 110 and/or store information associated with award points (e.g., in a user profile).

Application server 160 may process information to conform to supported data format(s) for storage and/or further processing. Subject to receiving consent, application server 160 may also, or alternatively, monitor usage, capture, dedication, and/or participation histories associated with user device 110, station server 120, content server 130, audio video device 140, and/or ad server 170 to update the information received and/or provided over time to ensure that any changes and/or updates are captured by application server 160.

Database 165 may include one or more devices that store information received by and/or from application server 160. For example, database 165 may store copies of an application that are supported by and/or compatible with different types of user devices 110, audio video device 140, and/or servers 120, 130, 170. Database 165 may also store a website (e.g., the code associated therewith) that user devices 110 or any other server may access to receive the services described herein. Database 165 may store one or more user profile and/or one or more station profile. Database 165 may also, or alternatively, store content, content information, ad content, award point information, etc. and the data and/or metadata associated therewith. Database 165 may store any information and/or data transmitted within environment 100.

Ad server 170 may include one or more computation or communication devices that gather, process, search, store, and/or provide information in a manner described herein. For example, ad server 170 may be associated with one or more entity or individual that desires to provide ad content (hereinafter, "advertiser" or "ad content provider") to user device 110, station server 120, audio visual device 140, broadcast station 150, and/or application server 160. Ad sever 170 may provide ad content to broadcast station 150 and/or station server 120 for broadcast, as further described herein. Additionally, or alternatively, ad server 170 may provide ad content to user device 110 based on user preferences (e.g., included in a user profile), content, and/or a location of user device 110. Additionally, or alternatively, ad server 170 may provide ad content to application server 160, such that application server 160 may, for example, include the ad content in a user profile, station profile, and/or send the ad content to a device and/or server in environment 100. Additionally, or alternatively, ad server 170 may be associated with broadcast station 150, station server 120, be included in station server 120, and/or be included in application server 160.

Network 180 may include one or more wired and/or wireless networks. For example, network 180 may include a cellular network, a public land mobile network (PLMN), a second generation (2G) network, a third generation (3G) network, a fourth generation (4G) network (e.g., a long term evolution (LTE) network), a fifth generation (5G) network, and/or another network. Additionally, or alternatively, network 180 may include a wide area network (WAN), a metropolitan network (MAN), a telephone network (e.g., the Public Switched Telephone Network (PSTN)), an ad hoc network, an intranet, the Internet, a satellite telecom network, overthe-air broadcast network, a fiber optic-based network, and/or a combination of these or other types of networks.

Figure 2:
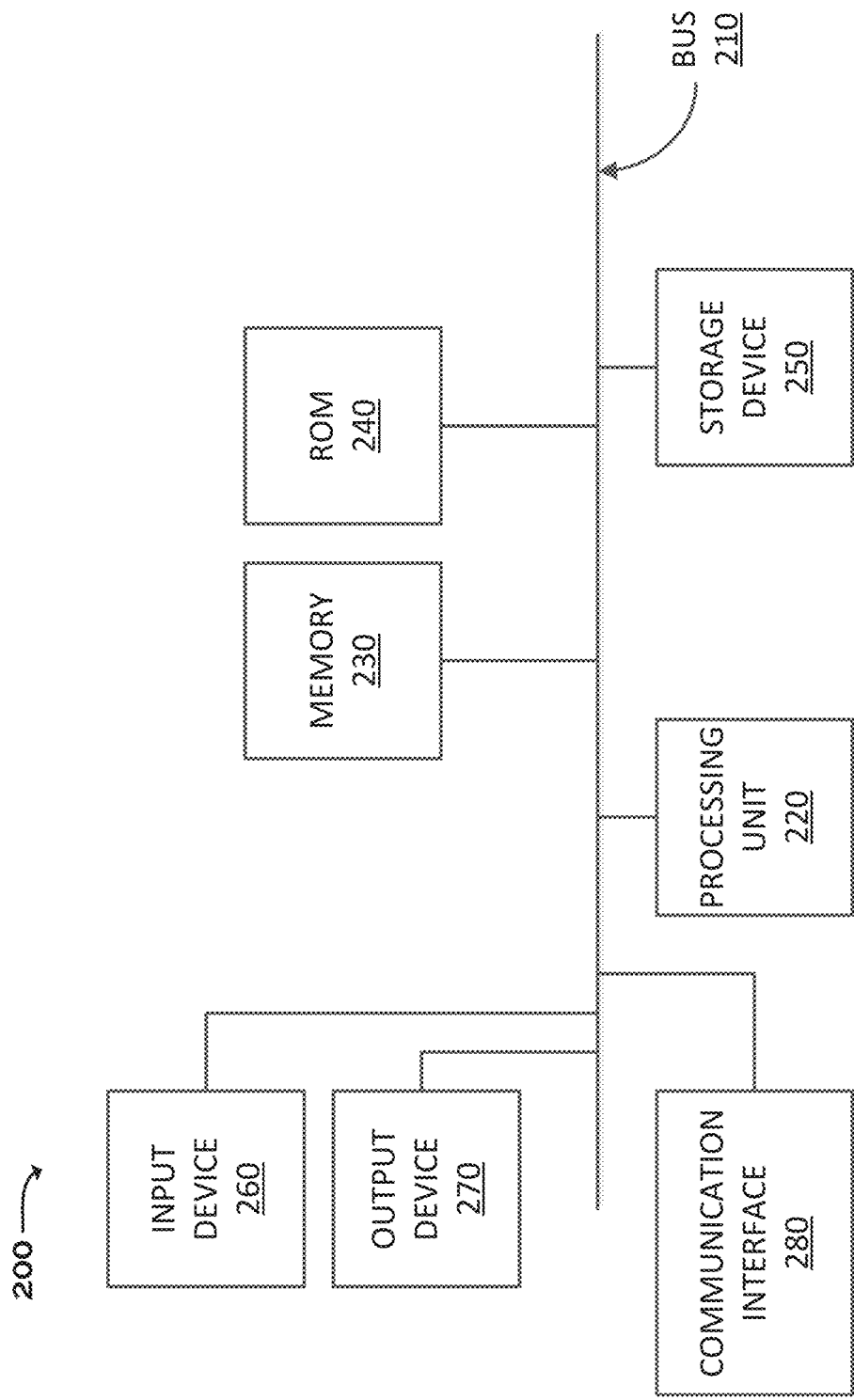
FIG. 2 is a diagram of example components of one or more of the devices and/or servers of FIG. 1.

FIG. 2 is a diagram of example components of a device 200 that may correspond to user device 110, station server 120, content server 130, application server 160, and/or ad server 170. Additionally, or alternatively, each of user device 110, station server 120, content server 130, application server 160, and/or ad server 170 may include one or more device 200. Device 200 may include a collection of components, such as a bus 210, a processing unit 220, a memory 230, a read-only memory ("ROM") 240, a storage device 250, an input device 260, an output device 270, and/or a communication interface 280. Although FIG. 2 shows example components of device 200, in other implementations, device 200 may include fewer components, additional components, different components, or differently arranged components than depicted in FIG. 2. Additionally, or alternatively, in other implementations, one or more components of device 200 may perform one or more tasks described as being performed by one or more other components of device 200.

Bus 210 may include a path that permits communication among the components of server 120. Processing unit 220 may include a processor, multiple processors, microprocessors, or other types of processing logic that may interpret, execute, and/or otherwise process information and/or data contained in, for example, the storage device 250 and/or memory 230. The information may include computer-executable instructions and/or data that may implement one or more embodiments of the systems and/or methods. Processing unit 220 may comprise a variety of hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. Processing unit 220 may comprise a single core or multiple cores. Moreover, processing unit 220 may comprise a system-on-chip (SoC) or system-in-package (SiP).

Memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive. In some implementations, memory 230 or storage device 250 may also be implemented as solid state memory, such as flash-based memory.

Input device 260 may include a mechanism that permits an operator to input information to device 200, such as a keyboard, a mouse, a pen, a single or multi-point touch interface, an accelerometer, a gyroscope, a microphone, voice recognition and/or biometric mechanisms, etc. Output device 270 may include a mechanism that outputs information to the operator, including a display, a printer, a speaker, etc. In the case of a display, the display may be a touch screen display that acts as both an input and an output device. Input device 260 and/or output device 270 may be haptic type devices, such as joysticks or other devices based on touch.

Communication interface 280 may include any transceiver-like mechanism that enables device 200 to communicate with other devices and/or systems. For example, communication interface 280 may include mechanisms for communicating with another device or system via a network, e.g., a network interface card.

Device 200 may perform certain operations in response to processing unit 220 executing software instructions contained in a computer-readable medium, such as main memory 230. For instance, device 200 may implement an application by executing software instructions from main memory 230. A computer-readable medium may be defined as a non-transitory memory device, where the memory device may include a number of physically, possibly distributed, memory devices. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

Figure 3:
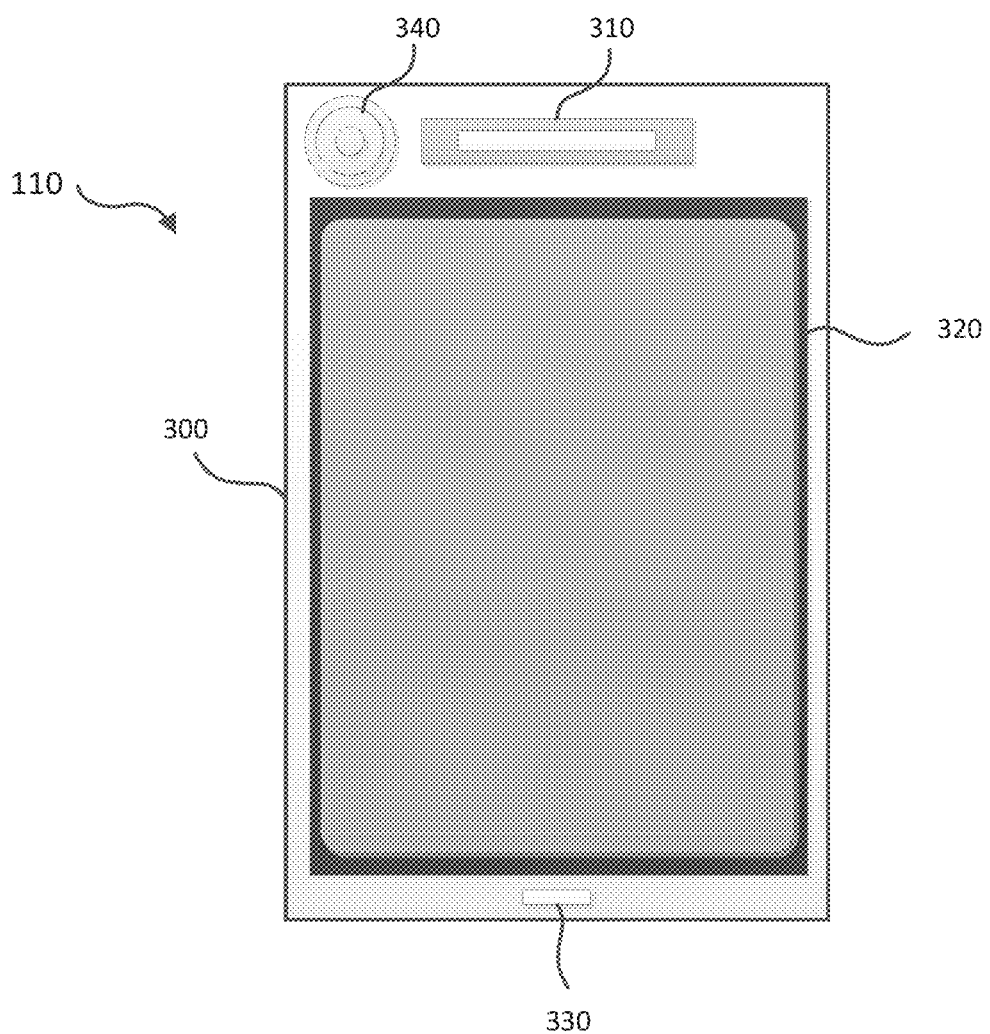
FIG. 3 is a diagram of an example user device of FIG. 1.

FIG. 3 is a diagram of an example user device 110. As shown in FIG. 3, user device 110 may include a housing 300, a speaker 310, a display 320, a microphone 330, and/or a camera 340. Housing 300 may include a chassis via which some or all of the components of user device 110 are mechanically secured and/or covered. Speaker 310 may include a component to receive input electrical signals from user device 110 and transmit audio output signals, which communicate audible information to a user of user device 110.

Display 320 may include a component to receive input electrical signals and present a visual output in the form of text, images, videos and/or combinations of text, images, and/or videos which communicate visual information to the user of user device 110. In one implementation, display 320 may display text input into user device 110, text, images, and/or video received from another device, and/or information regarding incoming or outgoing calls or text messages, emails, media, games, phone books, address books, the current time, etc.

Figure 9:
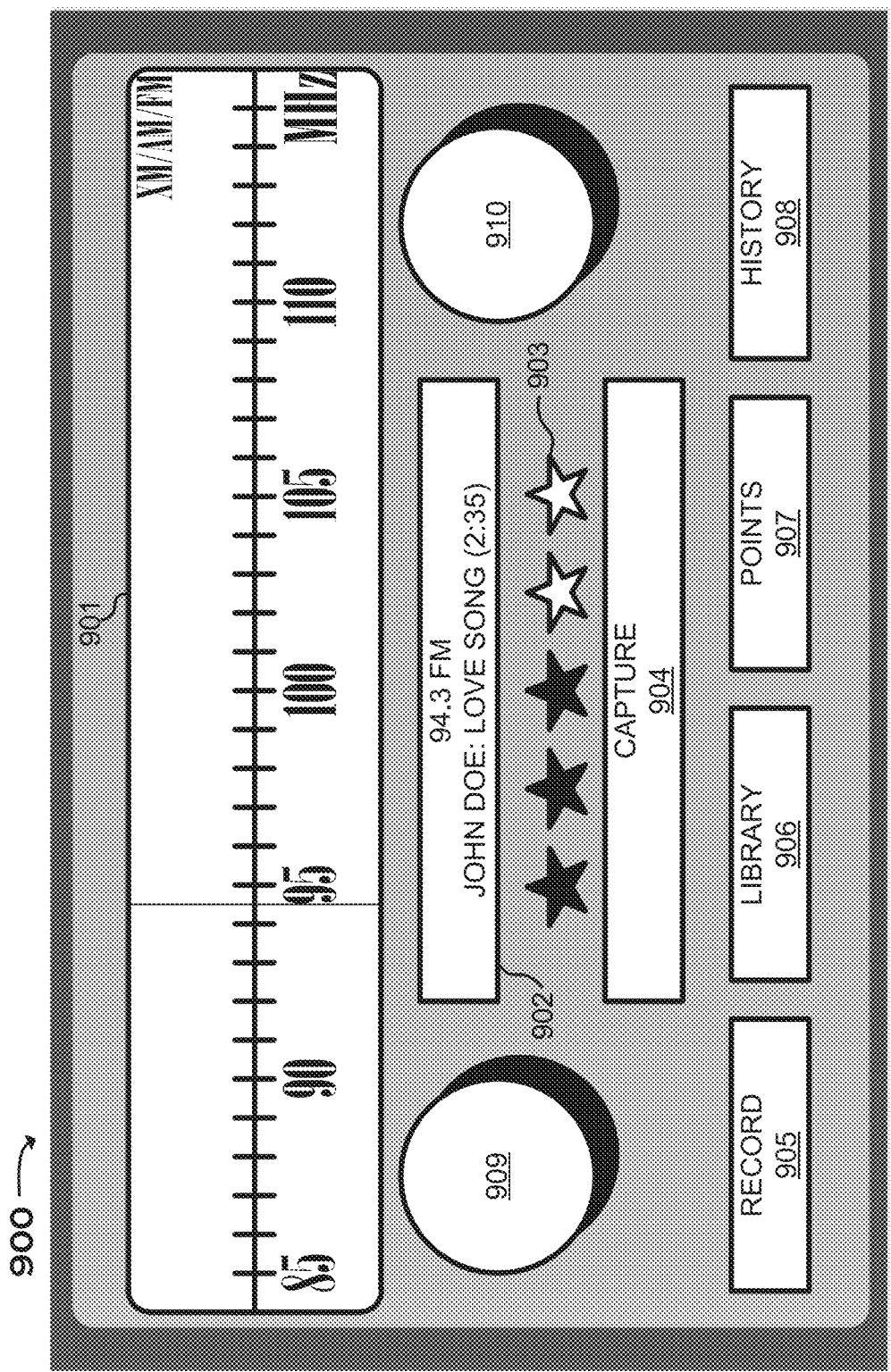
FIG. 9 is an illustration of an example user interface that may be displayed on a user device according to an implementation described herein.

Display 320 may be a touch screen that presents one or more images that corresponds to control buttons. The one or more images may accept, as input, mechanical pressure from the user (e.g., when the user presses or touches an image corresponding to a control button or combinations of control buttons) and display 320 may send electrical signals to a processor associated with user device 110 that may cause user device 110 to perform one or more operations. For example, the control buttons may be used to cause user device 110 to transmit information (e.g., via a user interface as shown in FIG. 9). Display 320 may present one or more other images associated with a keypad that, in one example, corresponds to a standard telephone keypad or another arrangement of keys. Display 320 may also, or alternatively, display a user interface (e.g., as shown in FIG. 9) which may enable user interaction with the systems and/or methods, application, and/or a website for provisioning the services described herein.

Microphone 330 may include a component to receive audible information from the user and send, as output, an electrical signal that may be stored by user device 110, transmitted to another user device, or cause the device to perform one or more operations. Camera 340 may be provided on a front or back side of user device 110, and may include a component to receive, as input, analog optical signals and send, as output, a digital image or video that can be, for example, viewed on display 320, stored in the memory of user device 110, discarded and/or transmitted to another user device 110.

Although FIG. 3 depicts example components of user device 110, in other implementations, user device 110 may include fewer components, additional components, different components, or differently arranged components than illustrated in FIG. 3. For example, user device 110 may include a keyboard, a keypad, and/or other input components. In still other implementations, one or more components of user device 110 may perform one or more tasks described as being performed by one or more other components of user device 110.

Figure 4:
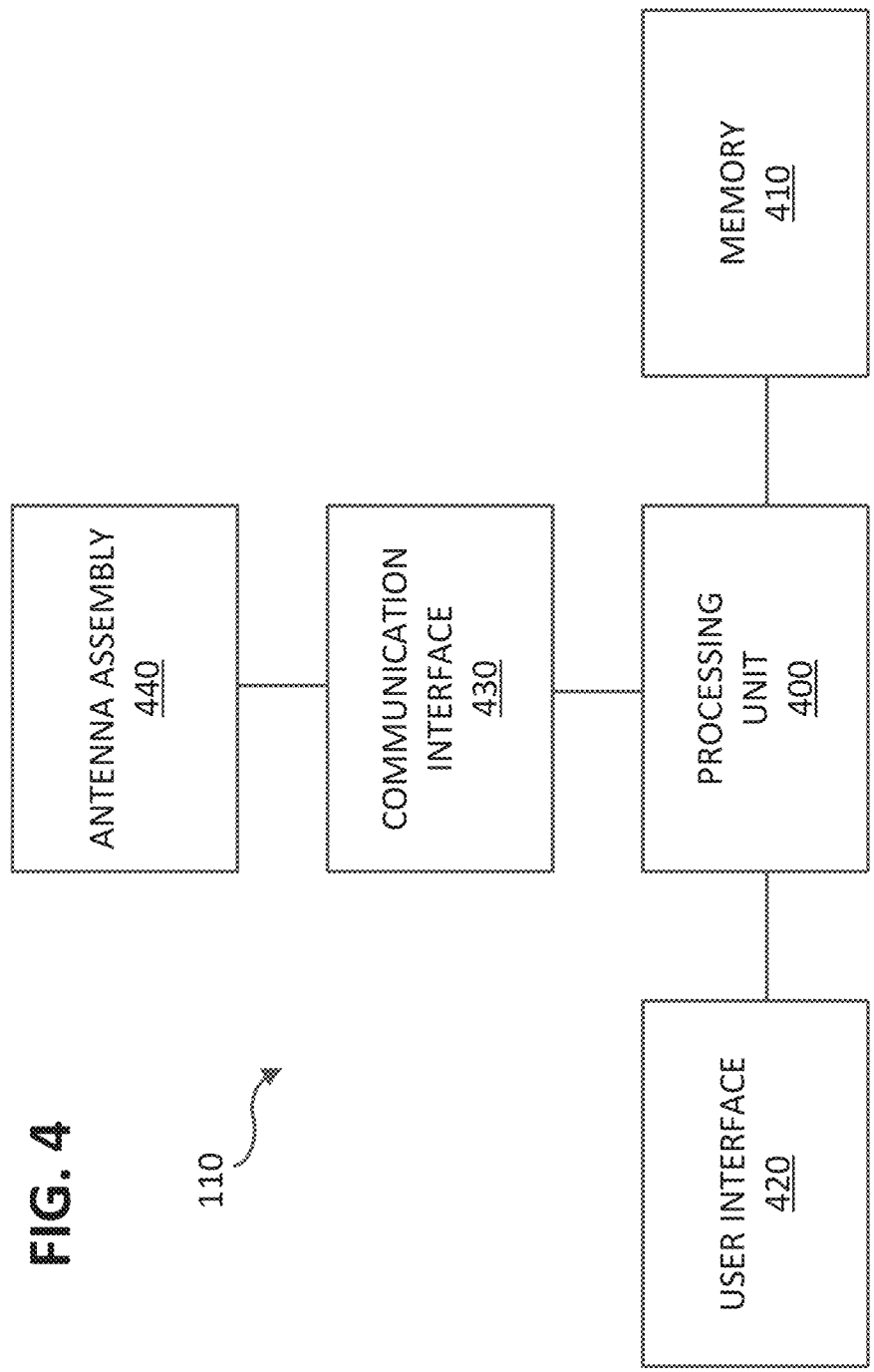
FIG. 4 is a diagram of example components of the user device of FIG. 3.

FIG. 4 is a diagram of example components of user device 110. As shown in FIG. 4, user device 110 may include a processing unit 400, a memory 410, a user interface 420, a communication interface 430, and/or an antenna assembly 440. Although FIG. 4 shows example components of user device 110, in other implementations, user device 110 may include fewer components, additional components, different components, or differently arranged components than depicted in FIG. 4. In still other implementations, one or more components of user device 110 may perform one or more tasks described as being performed by one or more other components of user device 110.

Processing unit 400 may include a processor, a microprocessor, an ASIC, a FPGA, or the like. Processing unit 400 may control operation of user device 110 and its components. In one implementation, processing unit 400 may control operation of components of user device 110 in a manner similar to that described herein. Memory 410 may include a RAM, a ROM, and/or another type of memory to store data and/or instructions that may be used by processing unit 400.

User interface 420 may include mechanisms for inputting information to user device 110 and/or for outputting information from user device 110. Examples of input and output mechanisms might include buttons (e.g., control buttons, keys of keypad, a keyboard, a joystick, etc.); a touch screen interface to permit data and control commands to be input into user device 110 via display 320; a biometric device to receive fingerprint scans, retinal scans, facial signatures, etc.; a speaker (e.g., speaker 310) to receive electrical signals and output audio signals; a microphone (e.g., microphone 330) to receive audio signals and output electrical signals; a display (e.g., display 320) to output visual information (e.g., user interfaces, web pages, etc.); a vibrator to cause user device 110 to vibrate; and/or a camera (e.g., camera 340) to receive video and/or images.

Communication interface 430 may include, for example, a transmitter that may convert baseband signals from processing unit 400 to RF signals and/or a receiver that may convert RF signals to baseband signals. Alternatively, communication interface 430 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one implementation, for example, communication interface 430 may communicate with a network and/or devices connected to a network (e.g., network 130, etc.).

Additionally, or alternatively, user device 110 may include radio components to receive content broadcast from broadcast station 150 and/or user device 110 could be integrated with components on which audio video device 140 is based.

As described in detail below, user device 110 may perform certain operations described herein in response to processing unit 400 executing software instructions of an application contained in a computer-readable medium, such as memory 410. The software instructions may be read into memory 410 from another computer-readable medium or from another device via communication interface 430. The software instructions contained in memory 410 may cause processing unit 400 to perform processes that will be described later. Alternatively, hardwired circuitry may be used in place of or in combination with software instructions to implement processes described herein. Thus, implementations described herein are not limited to any specific combination of hardware circuitry and software.

Figure 5:
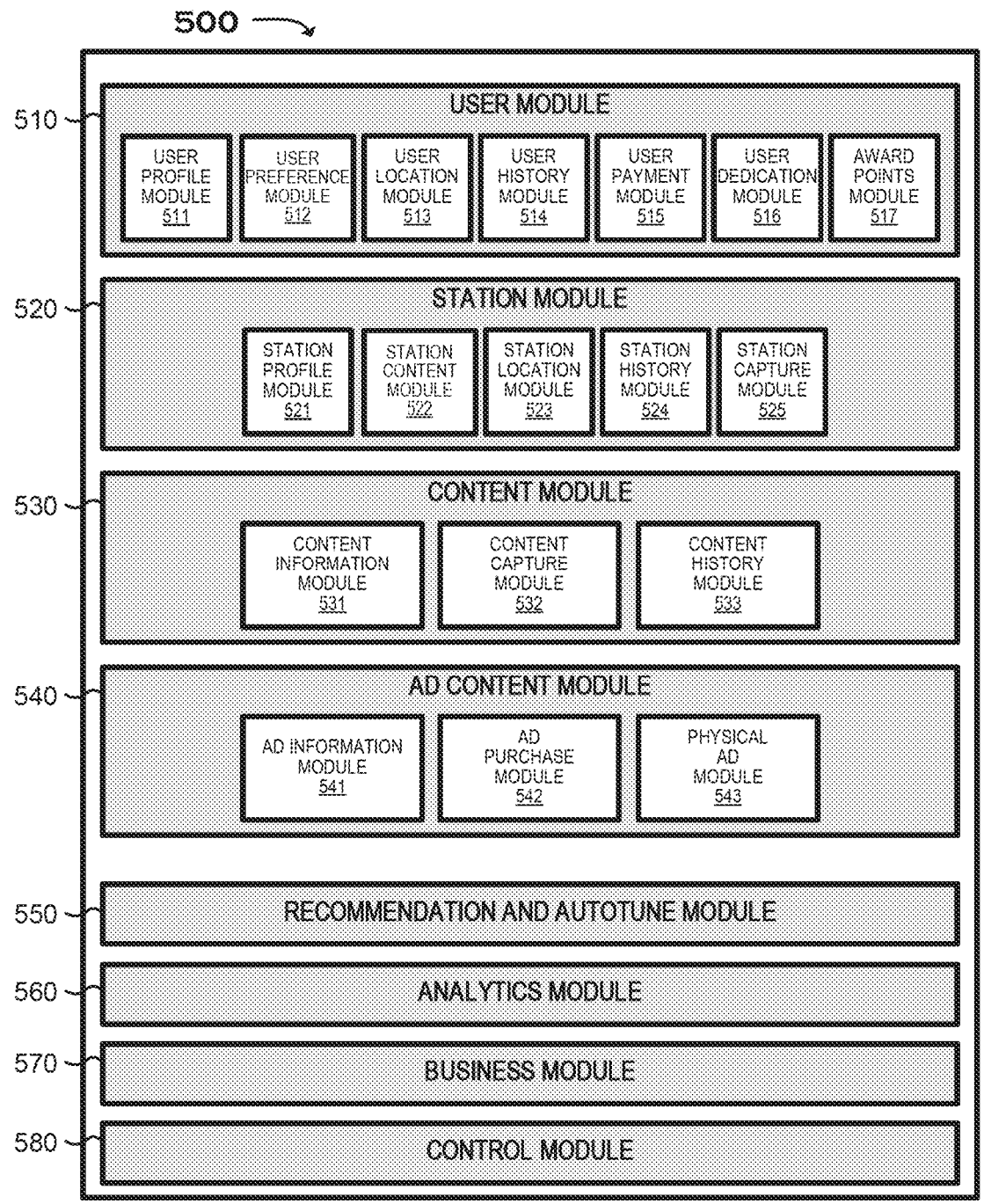
FIG. 5 is a diagram of an example framework that may be associated with an application being hosted and/or executed by an application server of FIG. 1.

FIG. 5 is a diagram of an example framework 500 that may be associated with an application being hosted and/or executed on application server 160. Additionally, or alternatively, the application may be hosted and/or executed on user device 110 and/or any of servers 120, 130, 170. The application may, for example, be executed by user device 110 to enable user device 110 to communicate with the other devices, databases, and/or servers within environment 100 and/or to receive the services described herein.

Framework 500 may include logic in the form of software, hardware (e.g., electronic, optical, etc.) or a combination of software and hardware that, when executed, enables application server 160 to perform the functions, activities, or tasks described herein. As shown in FIG. 5, framework 500 may include a collection of logical components and/or modules including a user module 510, station module 520, content module 530, ad content module 540, recommendation and autotune module 550, analytics module 560, business module 570, and/or control module 580.

Control module 580 may control a manner in which application server 160 uses modules 510-570. User module 510 may enable content, content information, ad content and/or any other information to be provided to a user of user device 110. User module 510 may, for example, include user profile module 511, user preference module 512, user location module 513, user history module 514, user payment module 515, user dedication module 516, and/or award points module 517.

User profile module 511 may enable application server 160 to create and/or maintain a profile associated with a user and/or user device 110 (hereinafter, "user profile") from which information associated with a user, user device 110, content, and/or ad content, may be received. Such a user profile may include user information (e.g., a name of user, an address of the user, a user email address, a sim URI, etc.), information associated with user device 110 (e.g., a network address, Internet Protocol (IP) address, a mobile directory number, an electronic serial number, etc.), an account number, a type of user subscription, etc. as further described herein.

User preference module 512 may enable preferences, associated with a user of user device 110, to be identified and/or managed. The preferences may, for example, identify a type and/or genre of content (favorite music genre, artists, songs, movie genre, etc.), goods and/or services, etc. preferred by the user, which may cause application server 160, station server 120, content server 130, and/or ad server 170, to recommend content and/or provide ad content and/or other promotional material, surveys, to user device 110, based on the user preferences.

User location module 513 may enable application server 160 to track and/or monitor the location of user device 110 and/or obtain information associated with the location from a server device that provides a location service. User location module 513 may also, or alternatively, enable application server 160 to identify if user device 110 is located within, adjacent, near, approximate to, etc. an entity and/or artist associated with station server 120, as further described herein.

User history module 514 may enable application server 160 to manage and/or track content provided to, rated by, and/or captured by user device 110. Additionally, or alternatively, user history module 514 may enable application server 160 to manage and/or track ad content provided to user device 110 and/or which ad content was selected by a user for capture, as further described herein. User history module 514 may also, or alternatively, enable application server 160 to manage and/or track one or more competition in which a user participates and/or to manage and/or track content recommended to a user.

User payment module 515 may enable application server 160 to receive and/or process payment information from a user device 110 (e.g., via a credit card, bank account, award points, etc.) for content and/or items associated with ad content. Additionally, or alternatively, user payment module 515 may enable application server 160 to securely store payment information and/or track the revenue, payment, and/or proceeds associated with a particular user and/or user device 110. User dedication module 516 may enable application server 160 to receive and/or send user input dedicating content to another user and/or user device 110, as further described herein. User dedication module 516 may also, or alternatively, enable application server 516 to manage and/ or track content dedicated by a user.

Awards points module 517 may enable application server 160 to provide award points to user device 110, for example, based on capturing content, listening time, competitions, captures of items associated with ad content, etc. Additionally, or alternatively, awards points module 517 may update and/or modify a user profile to reflect the award points associated with user device 110, as further described herein.

Station module 520 may control how application server 160 communicates with station server 120 and/or processes information associated with a broadcast station and/or station server 120. Station module 520 may, for example include station profile module 521, station content module 522, station location module 523, station history module 524, and station capture module 525.

Station profile module 521 may enable application server 160 to create and/or maintain a profile associated with a broadcast station 150 and/or station server 120 ("station profile"). Such a station profile may include station information, information associated with station server 120 (e.g., a network address, Internet Protocol (IP) address, a media access control (MAC) address, etc.), an account number, a type of subscription, etc., as further described herein.

Station content module 522 may enable application server 160 to manage, track, monitor, update, and/or modify the content associated with broadcast station 150, station server 120, and/or a station profile. Station content module 522 may enable application server 160 to manage and/or track content (and/or ad content) that is associated with broadcast station 150 and/or station server 120. Station content module 522 may also, or alternatively, enable application server 160 to manage and/or track content that is to be broadcasted by broadcast station 150 (e.g., upcoming playlist, schedule, etc.), the times at which the content is to be broadcasted, content information associated with the content to be broadcasted, etc. and/or to update a station profile accordingly.

Station location module 523 may enable application server 160 to track and/or monitor the broadcast area of broadcast station 150. Station location module 523 may also, or alternatively, enable application server 160 to identify if user device 110 is located within, adjacent, near, in proximity to, etc. the broadcast area of broadcast station 150 and/or an entity associated with station server 120, as further described herein.

Station history module 524 may enable application server 160 to manage and/or track content (and/or ad content) that has been previously broadcast by broadcast station 150. Additionally, or alternatively, station history module 524 may enable application server 160 to update a station profile based on the previously broadcasted content. Station history module 524 may also, or alternatively, enable application server 160 to manage and/or track one or more competition associated with broadcast station 150 (as further described herein), including whether or not a user was successful with respect to a competition and/or the prize associated therewith.

Station capture module 525 may enable application server 160 to manage and/or track which content broadcasted by broadcast station 150 is captured by user device 110. For example, station capture module 525 may enable application server 160 to manage and/or track the times, dates, and/or locations associated with user device 110 when content is captured and/or information associated with the content.

Content module 530 may control how application server 160 communicates with content server 130 and/or processes information associated with a content provider and/or content server 130. Content module 530 may, for example include content information module 531, content capture module 532, and content history module 533.

Content information module 531 may enable application server 160 to manage and/or track content information associated with content. For example, content information module 531 may enable application server 160 to identify which content provider has the rights to which content. Content information module 531 may enable application server 160 to process and/or transcode content and/or content information. Additionally, or alternatively, content information module 531 may enable application server 160 to update and/or modify content information. Content capture module 532 may enable application server 160 to provide copies of content to a user and/or user device 110 that requests content. The copies of content may be based on the type of user device 110, such that the copy is capable with the type of user device 110. For example, content capture module 532 may enable application server 160 to provide a copy with the aspect ratio, frame rate, bandwidth, data format, etc. that is supported by the type of user device 110. Content capture module 532 may enable application server 160 to track which content provider provided the captured content.

Content history module 533 may enable application server 160 to manage and/or track the history associated with a content provider and/or a content server 130. For example, content history module may enable application server 160 to manage and/or track content provided for capture by a content provider and/or content server 130. Additionally, or alternatively, content capture module 532 may enable application server 160 to track when user device 110 captured content, the location of user device when it captured content, which broadcast station 150 was broadcasting the content when user device 111 captured the content, to which broadcast station 150 audio video device 140 was tuned when user device 110 captured the content, etc.

Ad content module 540 may control how application server 160 communicates with ad server 170 and/or processes information associated with an ad content provider and/or ad server 170. Ad content module 540 may enable ad content to be provided to a user of user device 110. Ad content module 540 may, for example include ad information module 541, ad capture module 542, and physical ad module 543.

Ad information module 541 may enable application server 160 to manage and/or track the ad content associated with an ad content provider, ad server 170, broadcast station 150, and/or station server 120. Ad information module 541 may enable application server 160 to manage and/or track which ad content is provided to user device 110 and/or station server 120. Ad information module 541 may also, or alternatively, enable application server 160 to update and/or modify the ad content associated with an ad content provider, ad server 170, broadcast station 150, and/or station server 120 and any respective profiles associated therewith.

Ad capture module 542 may enable application server 160 to manage and/or track for which ad content user device 110 captures items advertised or otherwise associated with the ad content. Ad capture module 542 may enable application server 160 to provide capture information to user device 110 that is associated with items associated with ad content.

Additionally, or alternatively, ad content capture module 542 may enable application server 160 to manage and/or track the items captured by user device 110 from an ad content provider and/or update any profiles accordingly. Ad capture module 543 may enable application server 160 to manage and/or track which ad content provider, ad server 170, broadcast station 150, and/or station server 120 is associated with the ad content selected by user device 110 and/or the ad content from which a capture was made. For example, user device 110 may select ad content, receive capture information associated with the selected ad content, and/or capture items advertised or otherwise associated with selected ad content and application server 160 (or another server) may track such user device interactions. Physical ad module 543 may enable application server 160 to track and/or manage the location and/or ad content associated with a physical advertisement. Physical ad module 543 may enable application server 160 to track which ad content provider a physical advertisement is associated with.

Recommendation and autotune module 550 may enable application server 160 to provide a recommendation associated with content, ad content, a competition, and/or a broadcast station to user device 110 and/or station server 120. Additionally, or alternatively, recommendation and autotune module 550 may enable application server 160 to automatically adjust ("autotune") the frequency of audio video device 140 and/or user device 110 to a broadcast station based on, for example, location information associated with a user and/or station information (e.g., genres, content broadcasting, previously broadcasted, to be broadcasted, etc.).

Analytics module 560 may enable application server 160 to process information associated with content, ad content, capture of content, captures, etc. and create analytics. Analytics module 560 may enable application server 160 to provide analytics to station server 120, content server 130, and/or ad server 170 as further described herein. Additionally, or alternatively, analytics module 560 may enable application server 160 to filter analytics based on geographic area, time, broadcast station, content provider, ad content provider, etc. as further described herein.

Business module 570 may enable application server 160 to manage, process, and/or control payment for content (e.g., via credit card, bank account, awards points, etc.) and/or for items associated with ad content. Additionally, or alternatively, business module 570 may enable application server 160 to perform billing associated with a user of user device 110 and/or to track revenue associated with content, ad content, broadcast station 150, station server 120, a content provider, content server 130, an ad content provider, and/or ad server 170.

Although FIG. 5 shows an example number of modules associated with framework 500, in other implementations, framework 500 may include fewer modules, additional modules, different modules, or differently arranged modules than depicted in FIG. 5. In still other implementations, one or more modules of framework 500 may perform one or more tasks, functions and/or operations described as being performed by one or more other modules of framework 500. For example, framework 500 may include one or more modules that enable application server 160 to provide content and/or ad content associated with an entity, entity server, entity profile and/or otherwise interact and/or provide the services to an entity as described herein.

Figure 6:
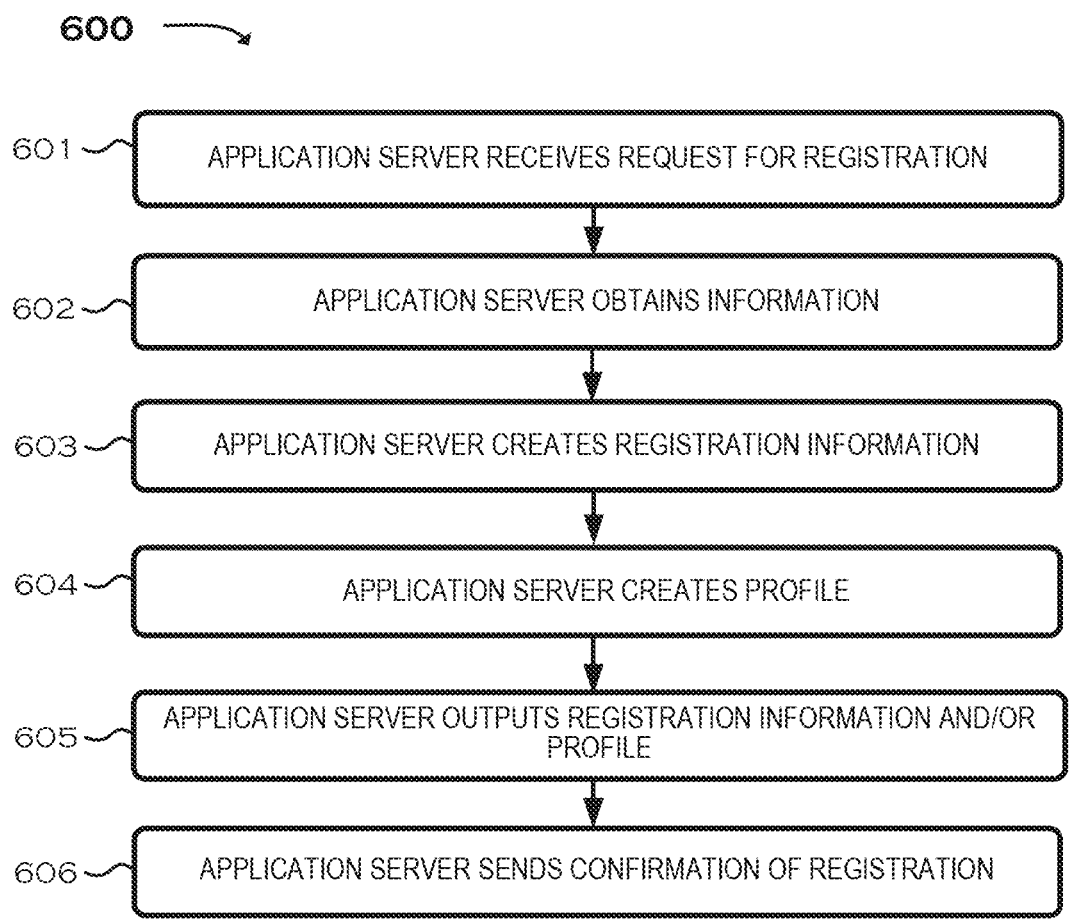
FIG. 6 is a flow chart of an example process that may be used to register a device and/or server according to an implementation described herein.

FIG. 6 is a flow chart of an example process 600 that may be used to register a device and/or server according to an implementation described herein. For example, application server 160 may receive a request to register (BLOCK 601) from user device 110, station server 120, content server 130, ad server 170, and/or any other device and/or server within environment 100. Application server 160 may obtain information associated with a device and/or server (BLOCK 402). For example, a broadcast station, associated with station server 120, may desire to register with application server 160 and may cause station server 120 to send a request to register with application server 160. Station server 120 may also, or alternatively, provide information associated with the station (e.g., name, station frequency, address, broadcast area, genre, etc.) and/or station server 120 (e.g., an IP address, MAC address, uniform resource locator (URL), an electronic serial number (ESN), etc.) to application server 160.

Additionally, or alternatively, in a manner similar to that described in the immediately preceding paragraph, a content provider may desire to make a copy of content available to a user and/or station and may cause content server 130 to transmit a request to register with application server 160. Similarly, content server 130 may also, or alternatively, provide information associated with the content provider and/or content server 130 including information that identifies a type of entity (e.g., a service provider desirous of providing content and/or content information offered by content provider) to application server 160.

Additionally, or alternatively, an ad content provider may desire to provide ad content to a user and/or a station and may cause ad server 170 to send a request to register with application server 160. Similarly, ad server 170 may also, or alternatively, provide information associated with the ad content provider and/or ad server 170 including information that identifies a type of entity (e.g., an ad content provider desirous of providing advertisements for goods, services, events, etc.) to application server 160.

Additionally, or alternatively, a user may desire to capture content, receive ad content and/or other services described herein, and may cause user device 110 to send a request to register with application server 160. User device 110 may, for example, provide information associated with the user (e.g., user name, age, address, ethnicity, gender, email address, telephone number, preferred content genres, payment information, etc.) and/or user device 110 (e.g., a MDN, an IP address, subscriber identification module uniform resource identifier (SIM URI), etc.) to application server 160.

Application server 160 may receive the request to register and may obtain, from the request, information associated with a device and/or server (e.g., depending on which of server 120, 130, 170 or user device 110 from which the request was sent) and/or information associated with a subscriber (e.g., broadcast station, content provider, ad content provider, and/or user).

As also shown in FIG. 6, application server 160 may create registration information associated with a device and/or server based on the type of subscriber (BLOCK 603), create a profile based on the information associated with the device, server and/or the type of subscriber (BLOCK 604), and output the registration information and/or a profile to a device and/or server (BLOCK 605). For example, application server 160 may, based on the type of subscriber, create registration information associated with the device, server, and/or the subscriber (e.g., user name, password, personal identification number (PIN), a confirmation number, etc.). Additionally, or alternatively, application server 160 may create a profile, associated with the device, server, and/or subscriber, that includes, for example, the registration information, the information associated with the device, the information associated with the subscriber, information identifying the type of subscriber, etc., and as further described herein (e.g., with respect to FIGS. 7-8). Application server 160 may store the profile in database 165. Based on creating the profile, application server 160 may send a notification, to the device and/or server, indicating that the device and/or subscriber is registered (BLOCK 606). The notification may also, or alternatively, include the registration information that the device may use to access application server 160 in a future session.

Once registered, a broadcast station may use station server 120 to send and/or receive content, content information, ad content, analytic information (as further described herein), etc. and/or receive and/or send any other information to and/or from application server 160, another device and/or server; a user may use user device 110 to receive content, content information, ad content, captured items (as further described herein), etc. and/or receive and/or send any other information to and/or from application server 160, another device and/or server; a content provider may upload and/or send content and/or content information, receive analytical information, and/or any other information to and/or from application server 160, another device and/or server within network 180; and an ad content provider may upload and/or send ad content that may be used to advertise items and enable the capture of items and/or send and/or receive any other information to and/or from application server 160, another device and/or server within network 180. Application server 160 may monitor and update usage histories and may create and maintain a profile associated with the user, station, content provider, and/or ad content provider. Additionally, or alternatively, once registered, a user device may access, download, and/or execute an application that may enable user device 110 to receive the services described herein. Additionally, or alternatively, in other non-limiting implementations, a device and/or server that has not registered may still capture content (e.g., free trial, pilot, etc.).

Figure 7:
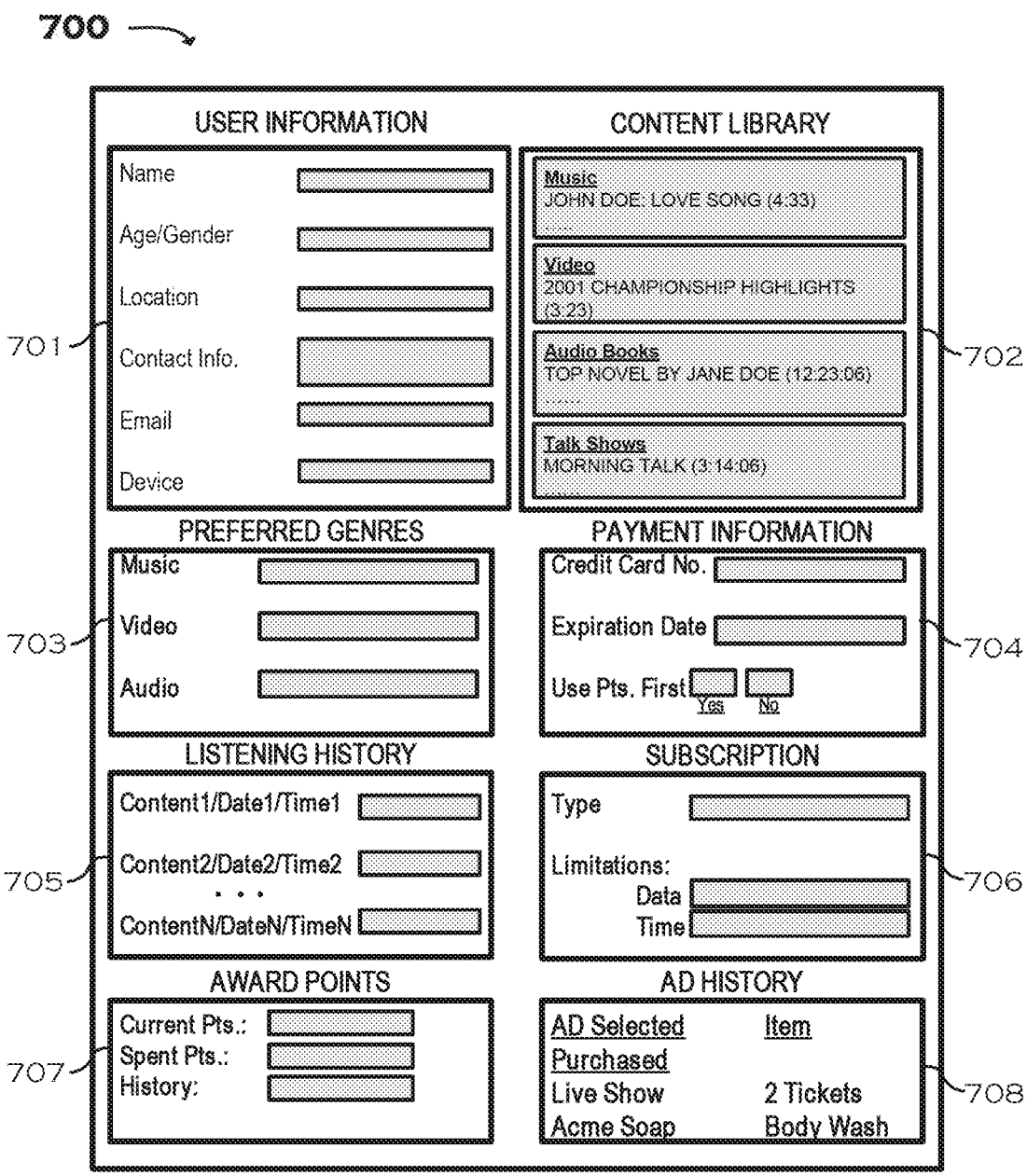
FIG. 7 is a diagram of an example user profile according to an implementation described herein.

FIG. 7 is a diagram of an example user profile according to an implementation described herein. User profile 700 may include user information 701, which may store, for example include a user's name, demographics (age, ethnicity, gender, job, etc.), type of user device 100 (e.g., phone, tablet, laptop, desk, watch, etc.), contact information (e.g., address, telephone number, facsimile number, email address, etc.), information associated with user device 110 (e.g., MDN, ESN, IP address, MAC address, etc.), and/or any other information associated with the user and/or user device 110. In one non-limiting implementation, user profile 700 may be identified by on information associated with user device 110 (e.g., MDN, ESN, IP address, MAC address, etc.), as further described herein. User information 701 may include information that identifies a current location of a user that may be provided, for example, to application server 160 by user device 110 (via a GPS mechanism associated with user device 110) and/or some other device ro server. Application server 160 may monitor information sent and/or received by user device 110 and/or may update and/or modify user information 701, for example, based on the monitored information.

User profile 700 may also, or alternatively, include content library 702 which may store content and/or content information (and/or arrangement of content) that has been received by, played on, captured, decoded, etc. by user device 110. Content library 702 may also, or alternatively, include information associated with music (e.g., artist name, title, duration, date and/or time obtained, etc.), video (e.g., title, author, subject matter, date produced, duration, etc.), non-music audio (e.g., title, artist/author, duration, time obtained, etc.), podcasts (e.g., title, artist/author, duration, time aired, etc.), user rating associated therewith, genres associated therewith, the broadcast station associated with the content, etc. Content library may include an identifier, indicator, key, and/or an authorization associated with content (as further described herein) that may be necessary for the user device 110 to access content that user device 110 has captured and/or otherwise has rights to. Application server 160 may monitor information sent and/or received by user device 110 and/or may update and/or modify content library 702, for example, based on the monitored information.

A user may access its content library 702 to play content via user device 110. For example, content that has been captured by user device 110 at any time. Content that has been leased and/or rented may be played until the limits of the lease or rental terms expire (e.g., time limits, allotments, data limits, etc.). For example, content (e.g., a song) may be captured to a user's content library for a limited time period (e.g., 48 hours), after which time period the content may no longer be available to a user. Content library 702 may also, or alternatively, be available to a user until the limits of the user's subscription are reached. For example, for an annual subscription, a user may only have access to content library 702 during the one year subscription term and any renewal term thereafter.

Additionally, or alternatively, user profile 700 may identify a user's preferred genres 703. A user may specify his or her preferred genres during registration and/or after registration via input to a user device (e.g., via a rating button on an interface). Application server 160 may also analyze user content ratings (as described in further detail herein) to identify a user's preferred genres. User profile 700 may store one or more preferred genre for each type of content and/or my rank the preferred genres (e.g., country music, horror films, sports talk, etc.) for each respective content type. Application server 160 may monitor information sent and/or received by user device 110 and/or may update and/or modify preferred genres 703, for example, based on the monitored information.

User profile 700 may include payment information 704, which may store, for example, information associated with one or more credit card (e.g., credit card number, expiration date, security code, etc.), one or more account (e.g., name on account, account number, routing number, entity associated with and/or holding the account, etc.), award points (e.g., amount available, amount used, etc. as further described herein), and/or any other electronic method of payment. Payment information 704 may store priority information that identifies which method of payment should be used first, second, third, etc. As shown by way of nonlimiting example in FIG. 7, a user may identify whether award points should be used to obtain content before a credit card is used to pay for some or all of an associated fee. In the event that the award points are insufficient to obtain the desired content, application server 160 may process payment based on the information associated with the one or more credit card. Application server 160 may monitor, update, and/or modify payment information 704, for example, based on the monitored information.

User profile 700 may also, or alternatively, include listening history 705 associated with a user and/or user device 110. For example, as shown in FIG. 7, listening history 705 may store information associated with each content (e.g., content1, content2 . . . contentN, where N≥1) transmitted by audio video device 140. Such information may include, without limitation, the type of content, date transmitted, time transmitted, title, artist/author, duration, etc. and/or the broadcast station associated therewith. Application server 160 may monitor information sent and/or received by audio video device 140 and/or user device 110 and/or may update and/or modify listening history 705, for example, based on the monitored information.

Additionally, or alternatively, user profile 700 may store information associated with a user's subscription 706 (hereinafter, "subscription information"). Subscription information 706 may store the type of subscription (e.g., annual, monthly, quarterly, weekly, daily, trial, free-trial, per transaction, etc.), the limits of the subscription (e.g., limits on content data, duration of content, subscription dates, allotments, etc.) and/or any other information associated with a user's subscription. Application server 160 may update and/or modify subscription information 706.

User profile 700 may include award point information 707, which may indicate the award points associated with a user. Award points may include points, data, time (e.g., length of content), and/or other forms of redeemable units. For example, award point information 707 may include the amount of award points a user currently has, the amount of award points previously used, redeemed, spent, etc. (hereinafter, "redeemed"), the redemption history associated with the redeemed award points (e.g., content captured in exchange for redeemed award points, items associated with ad content captured in exchange for redeemed award points, dates and/or times award points were redeemed, broadcast stations associated therewith, etc.) and/or any other information associated with award points. Application server 160 may monitor the information sent and/or received by user device 110 and/or may update and/or modify award point information 707, for example, based on the monitored information.

Application server 160 may add award points to user profile 700 when content is captured by user device 110 and/or when ad content is viewed and/or items (e.g., goods and/or services) associated with ad content are captured by user device 110. The award points may be accumulated over time, captured by the user (e.g., using a credit card, by paying an invoice or bill, etc.) and/or may be pre-charged and/or regenerated. For example, award points may be accumulated based on the amount of time audio video device 140 is tuned to a particular broadcast station and/or user device 110 is logged into an application and/or website associated with the services herein. Additionally, or alternatively, award points may be accumulated based on quantity of captured content, frequency of captures, quantity of data, level of subscription, etc. Additionally, or alternatively, award points may be accumulated when user device 110 is within, adjacent, near, approximate to, etc. an entity (e.g., restaurant, bar, venue, etc.) associated with station server 120 and/or that is registered with application server 160. Award points may be general (e.g., application to capture all content and/or items associated with ad content) and/or specific (e.g., applicable to capture only certain content and/or items (e.g., associated with an entity)). For example, a user located within a restaurant (e.g., that is registered with application server 160) may accumulate award points the longer user device 110 is located within the restaurant. The award points may be specific in that they may only be used to capture content played within the restaurant and/or be used to capture items associated with ad content of the restaurant (e.g., coupons, gift cards, etc.).

Award points may be reflected in a bill that the user receives from a service provider (e.g., an Internet service provider, a broadband service provider, a cellular network service provider, etc.) and/or from that with which application server 160 is associated. The accumulation of award points can act as a virtual currency that can be used to pay for captured content, pre-ordered arrangements of content, items associated with ad content, and/or to offset/reduce an amount of payment due that is reflected in a bill. Application server 160 may store information identifying how and/or when award points were accumulated and/or redeemed. The quantity of award points may be tracked, managed, and/or updated by application server 160 over time as captures are made.

User profile 700 may include the history associated with ad content received by user device 110 (hereinafter, "ad history 708"). For example, ad history 708 may include the name, subject matter, time, entity, etc. associated with ad content received by user device 110, items associated with ad content that have been captured via user device 110, a broadcast station and/or ad content provider that may be associated with the ad content, and/or any other information associated with ad content received by user device 110. Application server 160 may monitor the information sent and/or received by user device 110 and/or may update and/or modify ad history 708, for example, based on the monitored information. Additionally, or alternatively, a user may update and/or modify (e.g., via input to user device 110) user information 701, content library 702, preferred genres 703, payment information 704, listening history 705, subscription information 706, award point information 707, ad history 708, and/or any other information included in user profile 700.

The number and type of information and/or fields in FIG. 7, with respect to user profile 700, is provided for explanatory purposes only. Additionally, or alternatively, station profile 700 of FIG. 7 may include additional information and/or fields; less/fewer information and/or fields; different information and/or fields; or differently arranged information and/or fields than are shown in FIG. 7.

Figure 8:
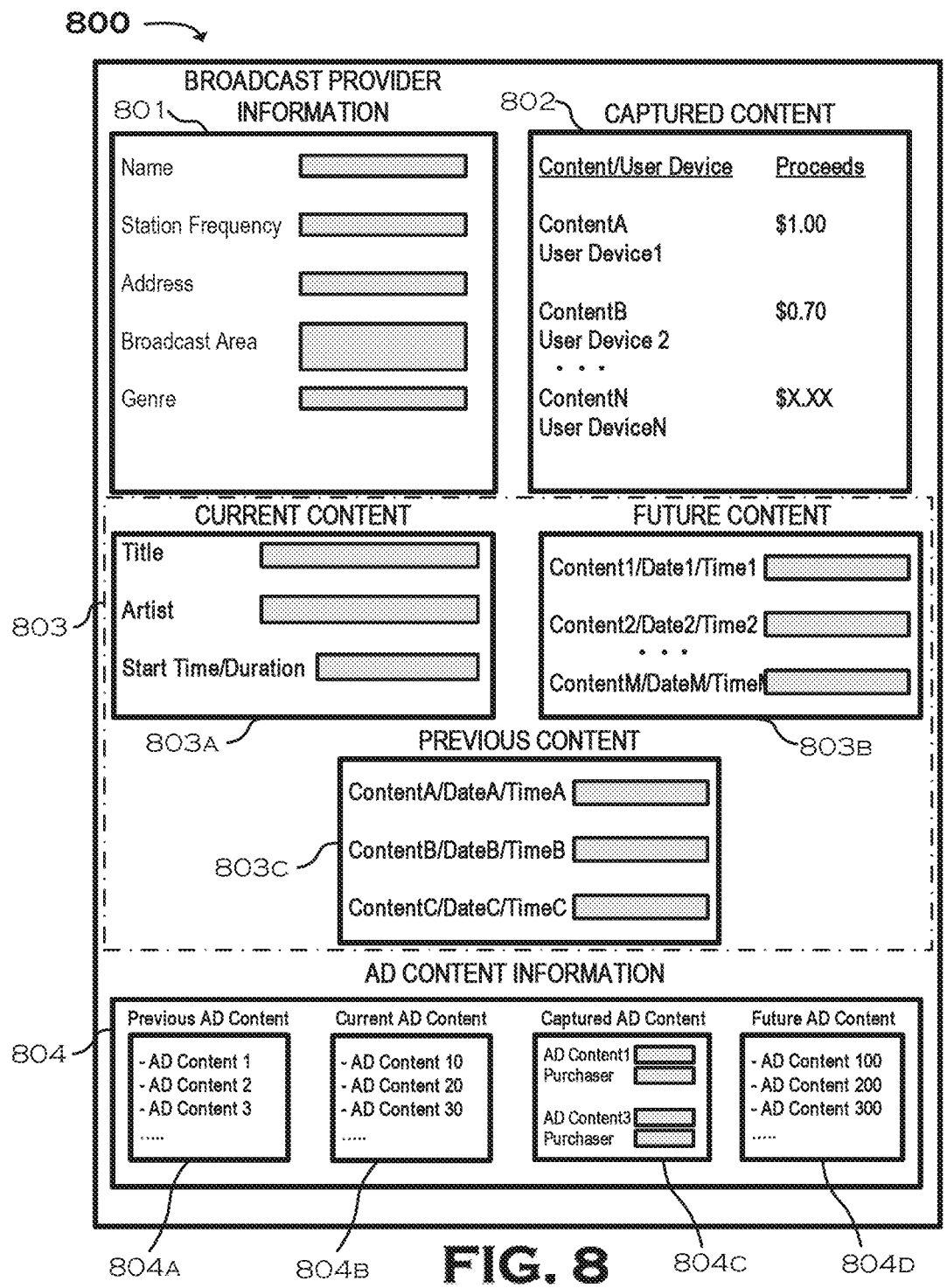
FIG. 8 is an illustration of an example station profile according to an implementation described herein.

FIG. 8 is an illustration of an example station profile according to an implementation described herein. Station profile 800 may store broadcast station information 801, which may include, for example, program information, a broadcast station name, station frequency, address, broadcast area, genre, and/or any other information associated with broadcast station 150. Application server 160 may monitor information sent and/or received by broadcast station 150 and/or station server 120 and/or may update and/or modify broadcast station information 801, for example, based on the monitored information. Additionally, or alternatively, station server 120 may continuously and dynamically generate and/or send information to application server 160, as further described herein.

Station profile 800 may include captured content information 802 which may include a content name, artist, author, date, start time, end time, duration, show, etc., an identifier, indicator, and/or key associated therewith and/or any other information associated with content that is associated with broadcast station 150 (e.g., been broadcasted, currently broadcasted, to be broadcasted, and/or otherwise associated therewith) and has been captured by user device 110. Additionally, or alternatively, captured content information 802 may include information (as described above) associated with a user of user device 110 and/or user device 110 that captures the content. Additionally, or alternatively, captured content information 802 may store information associated with the payment and/or proceeds (or portion thereof) received by broadcast station 150 as a result of the content being captured. Application server 160 may monitor content and/or content information captured by user device 110 and/or may update and/or modify captured content information 806, for example, based on the monitored content and/or content information.

Station profile 800 may store program information 803. For example, station profile may store current content information 803*a*, which may include a title, artist, author, broadcast start time, duration, etc. and/or any other information associated with content that is currently being broadcast by broadcast station 150. Application server 160 may monitor content and/or content information sent and/or received by broadcast station 150 and/or station server 120 and/or may update and/or modify current content information 803*a*, for example, based on the monitored content and/or content information. Station server 120 may continuously and dynamically send current content information (e.g., which song, show, interview, guest appearance, etc. is broadcasting) to application server 160. Application server 160 may receive such information and may use such information to update station profile 800.

Station profile 800 may store future content information 803*b*, which may identify content to be broadcast by broadcast station 150. For example, future content information 803*b* may include a schedule of content to be broadcast, content name, artist, author, date, start time, duration, etc. and/or any other information associated with content that is to be broadcasted by broadcast station 150 (e.g., content 1, content2 . . . contentM, where M≥1). Application server 160 may monitor content and/or content information sent, received, and/or associated with broadcast station 150 and/or station server 120 and/or may update and/or modify future content information 803*b*, for example, based on the monitored content and/or content information. Station server 120 may continuously and dynamically send future content information (e.g., which song, show, interview, guest appearance, content schedule, etc. is to be broadcasted) to application server 160. Application server 160 may receive such information and may use such information to update station profile 800.

Station profile 800 may store previous content information 803*c*, which may identify content that has been broadcasted by broadcast station 150. For example, previous content information 803*c* may include a content name, artist, author, date, start time, end time, duration, previous schedule, show, etc. and/or any other information associated with content that has been broadcasted by broadcast station 150. Application server 160 may monitor content and/or content information sent, received, and/or associated with broadcast station 150 and/or station server 120 and/or may update and/or modify previous content information 803*c*, for example, based on the monitored content and/or content information. Station server 120 may continuously and dynamically send previous content information (e.g., which song, show, interview, guest appearance, content schedule, etc. has been broadcasted) to application server 160. Application server 160 may receive such information and may use such information to update station profile 800.

Station profile 800 may also, or alternatively, include ad content information 804, which may include previous ad content information 804*a*, current ad content information 804*b*, captured ad content information 804*c*, and/or future ad content information 804*d*. Previous ad content information 804*a* may include a name, subject matter, time, entity, etc. associated with ad content broadcasted by broadcast station 150, items associated with ad content broadcasted by broadcast station 150, and/or any other information associated with ad content broadcasted by and/or otherwise associated with broadcast station 150. Current ad content 804*b* may include a name, subject matter, time, entity, etc. associated with ad content currently being broadcasted by broadcast station 150, items associated with ad content currently being broadcasted by and/or otherwise associated with broadcast station 150, and/or any other information associated with ad content currently being broadcasted by broadcast station 150. Captured ad content 804*c* may include a name, subject matter, time, entity, etc. associated with ad content broadcasted by broadcast station 150 and through which items have been captured by user device 110, items associated with ad content broadcasted by broadcast station 150 and that have been obtained by user device 110, and/or any other information associated with ad content broadcasted by or otherwise associated with broadcast station 150 and captured by user device 110. Additionally, or alternatively, captured ad content 804*b* may include user information (as described above) associated with a user that captures items associated with ad content. Future ad content 804*d* may include a name, subject matter, time, entity, etc. associated with ad content to be broadcasted by broadcast station 150, items associated with ad content to be broadcasted by or otherwise associated with broadcast station 150, and/or any other information associated with ad content to be broadcasted by broadcast station 150. Application server 160 may monitor ad content broadcasted, to be broadcasted, and/or captured by user device 110 and/or may update and/or modify ad content information 804, for example, based on the monitored information. Additionally, or alternatively, broadcast station 150 may update and/or modify broadcast station information 801, captured content information 802, program information 803, ad content information 804, and/or any other information included in station profile 800.

The number and type of information and/or fields in FIG. 8, with respect to station profile 800, is provided for explanatory purposes only. Additionally, or alternatively, station profile 800 of FIG. 8 may include additional information and/or fields; fewer information and/or fields; different information and/or fields; or differently arranged information and/or fields than are shown in FIG. 8.

FIG. 9 is an illustration of an example user interface that may be displayed on user device 110 (and/or be integrated into an automobile and/or audio video device 140) according to an implementation described herein. In one example, application server 160 may send, to user device, information associated with a user interface (e.g., user interface 900 of FIG. 6A). User interface 900 may be available to user device 110 upon registration and/or upon logging into an application and/or website. As illustrated in FIG. 9, interface 900 may include one or more field, object, and/or button including a display field 901, a content information field 902, one or more rating button 903, a capture button 904, a record button 905, a library button 906, a points button 907, a history button 908, a volume button 909, and/or a tune button 910.

In one non-limiting example, as shown in FIG. 9, display field 901 may indicate a broadcast station (e.g., channel associated therewith) to which audio video device 140 is tuned. For example, display field 901 may appear as a radio dial and/or include a station frequency (e.g., displayed pictorially) to which audio video device 140 is tuned (e.g., 94.3 FM). Additionally, or alternatively, display field 901 may display ad content for viewing by a user. In other nonlimiting implementations, there may be more than one display field including a first display field that indicates a station channel and/or a second display field that displays ad content. Additionally, or alternatively, in other non-limiting implementations, a display field may include ad content after content is captured (as described herein) and/or the type of ad content and/or the items associated therewith may depend on, for example, the location of the user device, content captured, the broadcast station to which audio video device 140 is tuned, time of day, etc.

Content information field 903 may include content information associated with content that is being broadcasted, content that has been broadcasted, and/or content that is to be broadcasted. Additionally, or alternatively, in other non-limiting implementations, content information field 902 may include information associated with ad content. For example, as shown in FIG. 9, content information field 902 may, for example, include a station frequency (e.g., displayed digitally), content title, content artist/author, duration, time remaining, etc. Volume button 905 may enable a user to adjust (e.g., increase or decrease) the volume of the content. Tune button 910 may enable a user to adjust the station frequency to which audio video device 140 is tuned.

Rating button 903 may enable a user to rate, rank, provide feedback regarding, comment on, etc. content (hereinafter, "rate"). In one non-limiting example, rating button 903 may enable a user to indicate a preference level for the content. For instance, as shown in FIG. 9, a user may indicate a preference level based on the number of stars selected by the user when the content is being broadcast (e.g., one star for lowest preference, five stars of highest preference, etc.). Application server 160 may receive the ratings and/or may process the rating to update and/or modify a user's preferred genre 703 included in user profile 700. Additionally, or alternatively, application server 160 may make recommendations and/or autotune audio video device 140 based on the preferred genres 703, as further described herein.

Capture button 904 may enable a user to capture content. For example, in the event that a user desires to capture the content being broadcast (e.g., John Doe's Love Song, as in FIG. 9), a user may select capture button 904 (e.g. a single button), which may cause user device 110 to send a request for content to application server 160. As further described below, user device 110 may receive an identifier, a key, and/or authorization associated with the content (enable user device 110 to access and play the content) and/or a copy of the content such that it is available to the user. Capture button 904 may enable user device 110 to purchase and/or lease content. In other non-limiting implementations, user interface 900 may include more than one capture button, where at least one button enables user device 110 to purchase content and at least one different button enables user device 110 to lease content. Additionally, or alternatively, capture button 904 (and/or a similar button) may enable a user and/or user device 110 to interact ad content (e.g., select to request capture information, capture one or more items advertised in ad content, additional ad content, etc.).

Additionally, or alternatively, content library button 906 may enable a user to access a content library that includes the content available to the user and/or user device 110, and/or a content library of another user and/or user device (e.g., in the event permission has been given to access another's user device). A user may access a content library (e.g., via content library button 906) to, for example, search and/or select content to be played.

Record button 905 may enable a user to record an audio input (e.g., voice). For example, in the event a user desires to dedicate content and/or respond to a competition (as further described herein), a user may select record button 905, which may cause user device 110 to record an audio input. As further described herein, user device 110 may send the audio input to application server 160 to dedicate content and/or respond to a competition. Additionally, or alternatively, user device may send audio input (e.g., a voice message) to another user device within network 180. Record button 905 may also, or alternatively, enable a user to record an audio input that requests content and/or provide another command that may instruct user device 110 (and/or application server 16) (e.g., to capture content, interact with ad content, capture items associated with ad content, send messages to other user devices, adjust the station channel, etc.). User device 110 may send the request for content (and/or other command) to application server 160 to, for example, capture content (as further described herein) and/or perform an operation according to the command.

Points button 907 may enable a user to view award point information 707 included in user profile 700. For example, in the event a user desires to view award point information 707 (e.g., before purchasing content), a user may select points button 907, which may cause user device 110 to display award point information 707 (e.g., current amount of points, amount of points redeemed, history, etc.). User device 110 may also, or alternatively, display award point information 707 such that a user may view the accumulation and/or redemption of award points in real time. Additionally, or alternatively, points button 907 may enable a user to send award points to another user device and/or donate award points.

History button 908 may enable a user to view listening history 705, ad history 708, capture history (e.g., capture of content, items associated with ad content, etc.), and/or any other acts and/or history associated with the user and/or user device 110. For example, in the event that a user desires to view the history of items (e.g., associated with ad content) captured by user and/or user device 110, the user may select history button 908 to view the user's ad history 708. Additionally, or alternatively, history button 908 may enable a user to view previously dedicated content, user inputs, competitions and/or related user competition inputs, and/or information associated therewith.

The number of fields, objects, and/or buttons shown in FIG. 9, with respect to user interface 900, is provided for explanatory purposes only. Additionally, or alternatively, user interface 900 of FIG. 9 may include additional fields, objects and/or buttons; fewer fields, objects and/or buttons;

different fields, objects and/or buttons; or differently arranged fields, objects and/or buttons than are shown in FIG. 9.

Figure 10:
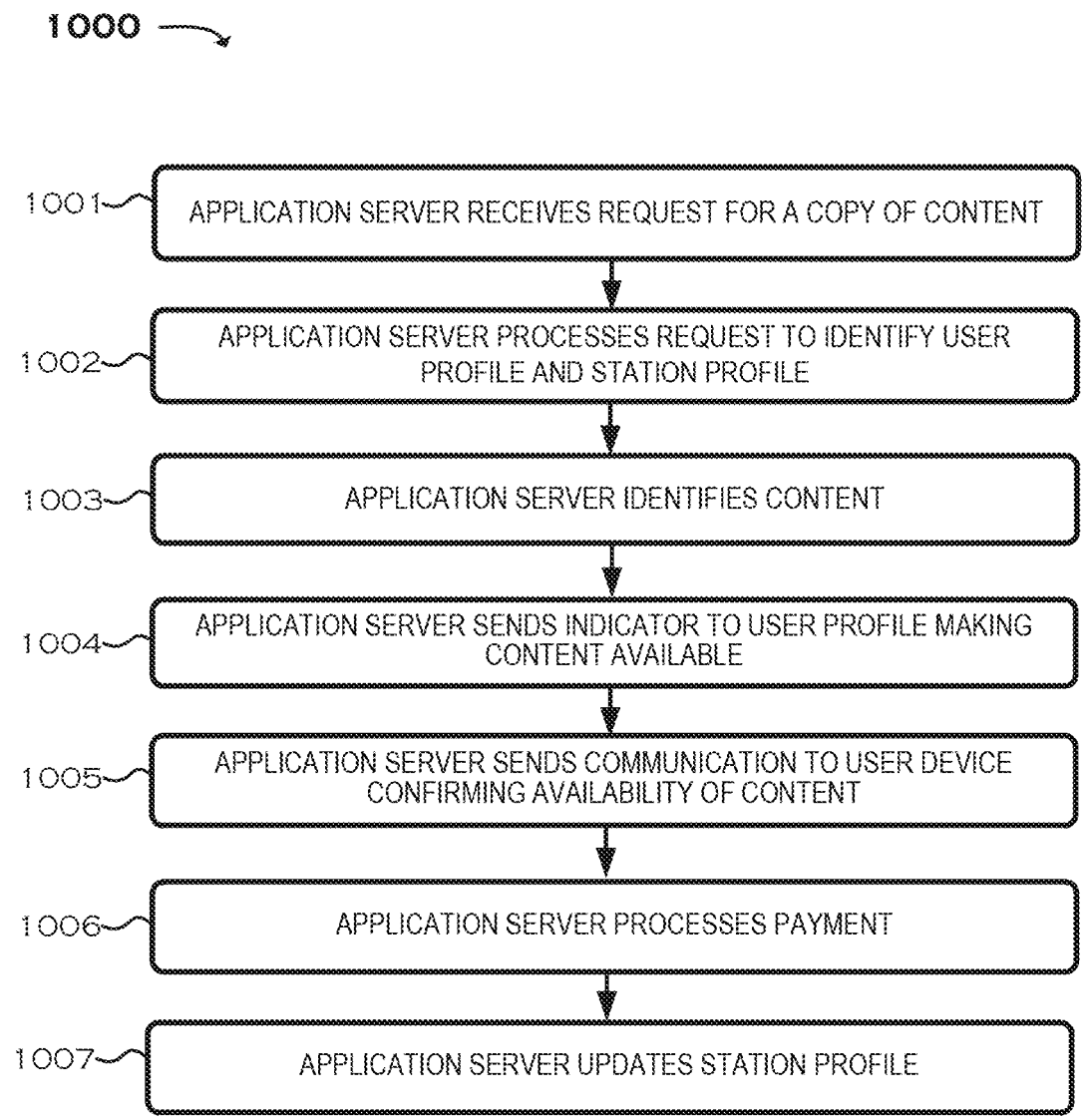
FIG. 10 is a flow chart of an example process that may be used to provide content to a user device according to an implementation described herein.

FIG. 10 is a flow chart of an example process 1000 that may be used to make content available to user device 110 according to an implementation described herein. Broadcast station 150 may broadcast and/or send content and/or content information over the air and/or via network 180. Audio video device 140 may receive the content and content information and may, for example, play the content for listening by a user. Audio video device 140 may send the content information to user device 110 (e.g., via wired or wireless (Bluetooth, near field, wifi, etc.) technology. User device 110 may receive the content information and may display the content information, for example, so that a user can identify the title, artist, duration, broadcast station, frequency, channel information, etc. associated with the content. In the event that a user desires to capture the content, user device 110 may receive a user input (e.g., via a user interface, displayed on a touchpad, that includes a button that enables capturing, as shown in FIG. 9) requesting the content. User device 110 may send a request for a copy of the content to application server 160.

Application server 160 may receive a request (e.g., via a hypertext transfer protocol (HTTP) or some other protocol) or a copy of the content from user device 110 (BLOCK 1001). The request may include, for example, an identifier associated with user device 110 (e.g., MDN, ESN, etc.) that may enable application server 160 to identify a user profile associated with user device 110, an identifier associated with the requested content ("content identifier") that may enable application server 160 to identify the content that is being requested, content information and/or station information (e.g., name, frequency of the station, channel information, etc.) that may enable application server 160 to identify a station profile associated with broadcast station 150, etc. The request may also, or alternatively, include any other information associated with broadcast station 150 that may enable application server 160 to identify a station profile associated with broadcast station 150, any other information and/or identifier associated with user device 110 that may enable application server 160 to identify a user profile associated with user device 110, and/or any other information and/or identifier that may enable application server 160 to identify the content that is requested. Additionally, or alternatively, a request for content may include location information associated with user device 110 that identifies a location of user device 110. The location information may enable application server 160 to identify a station profile associated with the broadcast content. For example, application server 160 may identify and/or select from (and/or differentiate between) two or more broadcast stations within a geographic area that share the same and/or similar broadcast channel.

Application server 160 may process the request to identify a user profile associated with the user and/or user device 110 (e.g., by matching some or all of the identifier associated with user device 110 in the request with a user device identifier stored in the user profile) and to identify a station profile associated with broadcast station 150 (e.g., by matching the station information to information stored the station profile) (BLOCK 1002). Application server 160 may process the requested content to identify the requested content (BLOCK 1003). For example, application server 160 may identify the content by matching the content identifier included in the request to an identifier associated with the content stored in the station profile (e.g., in the program information), that identifies content that was recently broadcast, is currently being broadcast, or may in the future be broadcast.

Application server 160 may send, to the user profile, an indicator and/or notification granting user device 110 (and/or any other device associated with the user) access to and/or the ability to play the content (BLOCK 1004). In this way, application server 160 may make the content available to user device 110 and/or another device associated with the user (e.g., for playing). Once the content is available, user device 110 may communicate with and/or access application server 160, content server 130, and/or station server 120 to play the content. For example, application server 160 may generate a notification in a manner that includes a first authorization code. Application server 160 may send the notification to user device 110. User device 110 may send to application server 160 a second authorization code. Application server 160 may receive, from user device 110, the second authorization code and may send the copy of the content to user device 110 when the first authorization code matches the second authorization code. Additionally, or alternatively, application server 160 may not enable user device 110 to access and/or send a copy of the content to user device 110 when the first authorization code does not match the second authorization code.

Additionally, or alternatively, application server 160 may select a specific copy of content that may be sent, captured and/or played by a specific type and/or brand of user device 110. For example, application server 160 may send a copy of the content with the aspect ratio, frame rate, bandwidth, resolution, data format, etc. that is supported by the type and/or brand of user device 110. Additionally, or alternatively, application server 160 may obtain a copy of the content and/or transcode, convert, or otherwise format the copy of the content such that it may be supported by user device 110.

Additionally, or alternatively, application server 160 may obtain a key (e.g., from database 165, content server 130, station server 120, etc.) that enables the content to be encrypted, decrypted, etc. Application server 160 may provide the indicator and/or notification to the user profile (as described above) and/or a copy of the key to user device 110 that enables a copy of encrypted content to be decrypted, downloaded, streamed, and/or played on the user device 110. In one non-limiting example, in the event that the content is leased and/or rented, the key may be associated with a lease that expires after a period of time. Expiration of the key may preclude user device 110 from decoding the content, playing the content, downloading or streaming the content, or may cause an indicator and/or notification (that indicates that access has been granted to the content) to be removed from the user profile. Additionally, or alternatively, application server 160 may send a copy of the content directly to user device 110 and/or may cause another device and/or server (e.g., content server 130, station server 120) to provide a copy of the content directly to user device 110. The content may be provided to user device 110 in near real-time (e.g., streaming, progressive download, etc.), user specified basis, and/or deferred basis.

Application server 160 (and/or another server) may send a communication to user device 110 confirming the availability of the content (BLOCK 1005). Application server 160 may process payment for the requested content (BLOCK 1006). For example, application server 160 may process payment information stored in a user profile (e.g., credit card, account, etc.) and/or redeem award points associated with the user and/or user device 110 as payment for the content. Application server 160 may provide payment proceeds to station server 120, content server 130, and/or any other server or device associated with a party that is entitled to receive a portion of the proceeds (e.g., royalty, fee, etc.) based on terms of a pre-negotiated server level agreement (SLA). Additionally, or alternatively, application server 160 may provide an invoice, bill, and/or payment confirmation to user device 110. Additionally, or alternatively, application server 160 may identify a portion of the payment to be provided to broadcast station 150 as a result of the user device receiving access to the content.

Application server 160 may update the station profile associated with broadcast station 150 to indicate that the content has been captured by user device 110 (BLOCK 1007). For example, application server 160 may update the station profile to include an indicator and/or notification that user device 110 has been granted access to the content, the identifier associated with the user device, and information identifying the portion of payment to be provided to the broadcast station 150 as a result of the user device receiving access to the content. Application server 160 may also, or alternatively, update station profile to include the specific content captured, information and/or identifier associated with user device 110 (and/or the associated user) which captured the content, and/or any proceeds associated therewith (e.g., to which broadcast station 150 is entitled or received) based on the SLA. Station server 120 may use such information to directly communicate with user device 110 (e.g., to send thank you, ad content, promotional material, coupons, discounts, other rewards, etc.).

While series of blocks are identified with regard to FIG. 10, the order and/or timing of the blocks is not intended to be limiting and may be modified in other implementations. Further, non-dependent blocks may be performed concurrently, substantially concurrently, and/or in a different order. Additionally, or alternatively, in other implementations, process 1000 may include additional steps, less steps, modified steps, and/or different steps than shown in FIG. 10. For example, in other non-limiting implementations, user device 110 may access a station profile to view and/or select content to be capture (in a manner similar to that described below with respect to FIG. 12). Thereafter, user device 110 may send a request for a copy of content to application server 160, as described above. Additionally, or alternatively, in other non-limiting implementations, user device 110 may communicate directly with station server 120 and/or content server 130 to obtain a copy of the content.

Additionally, or alternatively, a user may use the user device 110 to communicate with station server 120 and/or application server 160 to pre-order a list and/or arrangement of content. For example, user device 110 may communicate with the application server 160 to capture some or all of the arrangement at a time convenient to the user. Additionally, or alternatively, the arrangement may be ordered as unicast content to be sent to user device 110 or some other user device 110 specified by the user at a particular time and/or a specified time period (e.g., during a party, during hours of operation of a restaurant or nightclub, etc.). Additionally, or alternatively, the arrangement may be ordered as multicast content to be transmitted to two or more user devices specified by the user.

Figure 11:
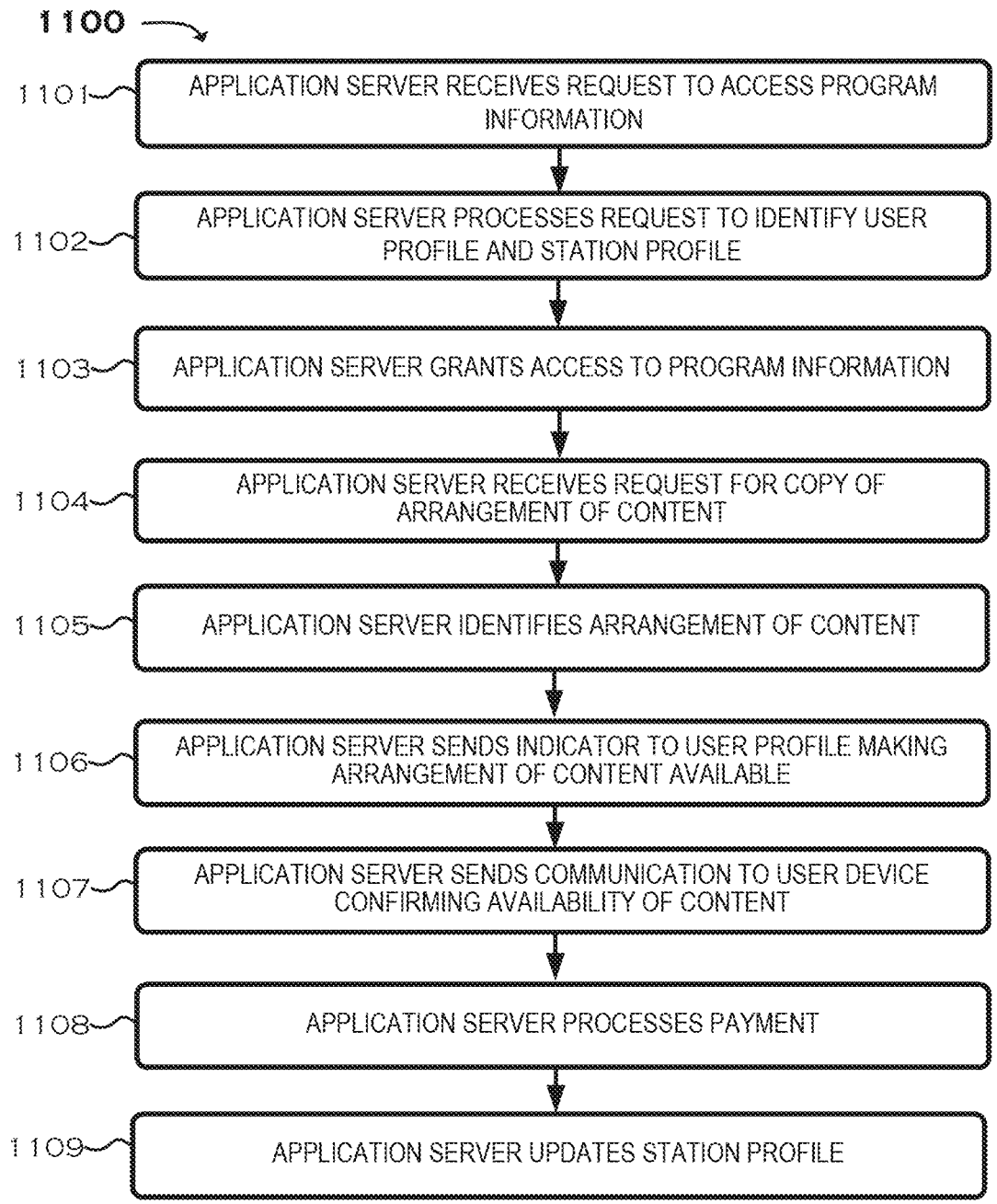
FIG. 11 is a flow chart of example process by which an application server may provide an arrangement of content to a user device, according to an implementation described herein.

FIG. 11 is a flow chart of example process 1100 by which application server 160 may enable user device 110 to access an arrangement of content, according to an implementation described herein. Application server 160 may receive, from user device 110, a request to access the program information associated with station server 120 and/or broadcast station 150 (stored in a station profile) (BLOCK 1101). The request may include an identifier (and/or any other information) associated with user device 110 that may enable application server 160 to identify a user profile associated with user device 110 (as described above) and information associated with broadcast station 150 that may enable application server 160 to identify a station profile associated with broadcast station 150 (as described above). Application server 160 may process the request to identify a user profile associated with user device 110 and a station profile associated with broadcast station 150, in a manner similar to that described above with respect to FIG. 10 (BLOCK 1102).

Application server 160 may grant user device 110 access to the program information stored in the station profile associated with broadcast station 150 (BLOCK 1103). For example, application server 160 may grant such access to user device 110 in the event that the station profile indicates that user device 110 (and/or another user device) may access the program information (e.g., based on user device 110 previously capturing content from the station profile, proceeds from transactions involving user device 110, subscription type, user device location, etc.). User device 110 may access the program information associated stored in the station profile associated with broadcast station 150, identify an arrangement (e.g., one or more, collection, series, group, etc.) of content included in the program information, and may send a request to application server 160 for the arrangement of content.

Application server 160 may receive the request for a copy of the arrangement of content (BLOCK 1104). The request may include one or more content identifier for the content included in the arrangement of content. Application server 160 may process the request for the arrangement of content to identify the content in the program information of the station profile, in a manner similar to that described above with respect to FIG. 10 (BLOCK 1105). Application server 160 may send an indicator, notification, key, and/or copy of the arrangement of content to user device 110 making the arrangement of content available to user device 110 and/or another user device 110 associated with the user (in a manner similar to that described above with respect to FIG. 10) (BLOCK 1106). Application server 160 may send a communication to user device 110 confirming the availability of the arrangement of content in a manner similar to that described above (BLOCK 1107). Additionally, or alternatively, application server 160 may process payment in a manner similar to that described above (BLOCK 1108) and may update the station profile associated with broadcast station 150 to indicate that the arrangement of content was captured by user device 110 (BLOCK 1109), in a manner similar to that described above with respect to FIG. 10.

While series of blocks are identified with regard to FIG. 11, the order and/or timing of the blocks is not intended to be limiting and may be modified in other implementations. Further, non-dependent blocks may be performed concurrently, substantially concurrently, and/or in a different order. Additionally, or alternatively, in other implementations, process 1100 may include additional steps, less steps, modified steps, and/or different steps than shown in FIG. 11. For example, in other non-limiting implementations, user device 110 may request access to program information of more than one broadcast station (e.g., request access to more than one station profile) and may request a copy of an arrangement of content that includes content associated with two or more different broadcast stations.

Figure 12A:
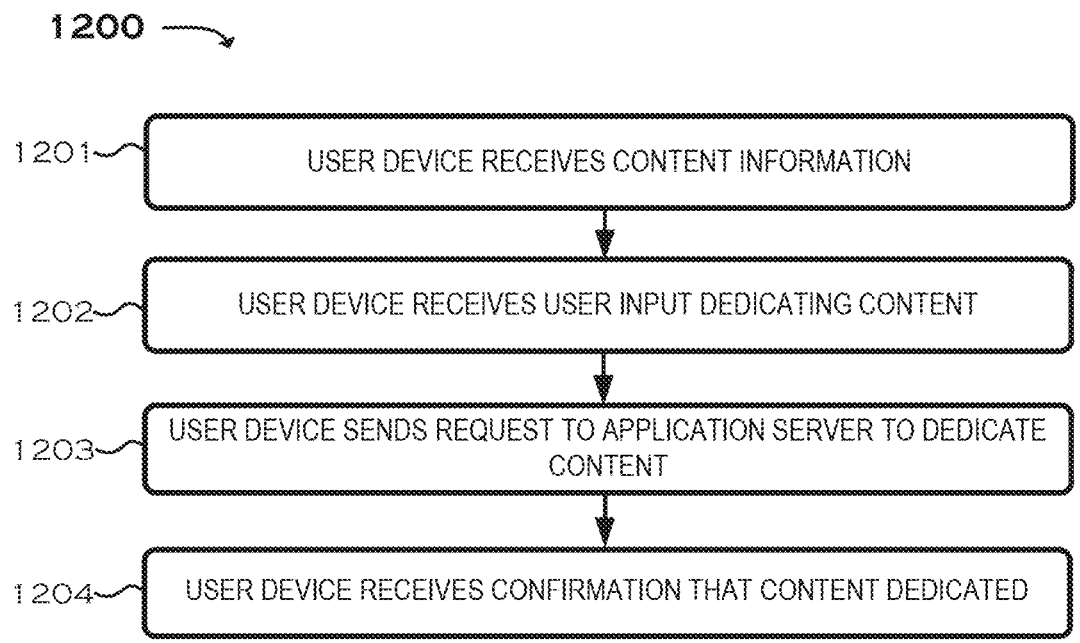
FIG. 12A is a flow chart of an example process by which a user may dedicate content according to an implementation described herein.

FIG. 12A is a flow chart of an example process 1200 by which a user may dedicate content. Broadcast station 150 may broadcast content and content information over the air and/or via network 180. Audio video device 140 may receive the content and content information and may play the content for listening by a user. Audio video device 140 may send the content information to user device 110. User device 110 may receive the content information (BLOCK 1201) and may display the content information. In the event a first user desires to dedicate content to a second user ("target user"), the first user may provide, to user device 110, user input (e.g., voice message, text message, email, etc.) dedicating content to the target user and/or target user device (e.g., 110). User device 110 may receive the user input dedicating content (BLOCK 1202) and may send a request to application server 160 that requests the content be dedicated (BLOCK 1203). The request to dedicate content may include, for example, a content identifier to enable application server 160 to identify the content to be dedicated, an identifier associated with user device 110 to enable application server 160 to identify a user profile associated with the user and/or user device 110, information associated with the target user and/or a user device of the target user (e.g., target user name, identifier associated with target user device (e.g., MDN, ESN, etc.) etc.) to enable application server 160 to identify a user profile associated with the target user and/or target user device, and/or information associated with broadcast station 150 (as described above) to enable application server 160 to identify a station profile associated with broadcast station 150 and/or station server 120 associated with broadcast station 150. Application server 160 may process the request, identify a station profile and the content, communicate with station server 120 to dedicate the content, and/or send a confirmation that the content has been dedicate to user device 110 (as described in further detail below). User device 110 may receive, from application server 160, a confirmation that the content has been dedicated (BLOCK 1204).

Figure 12B:
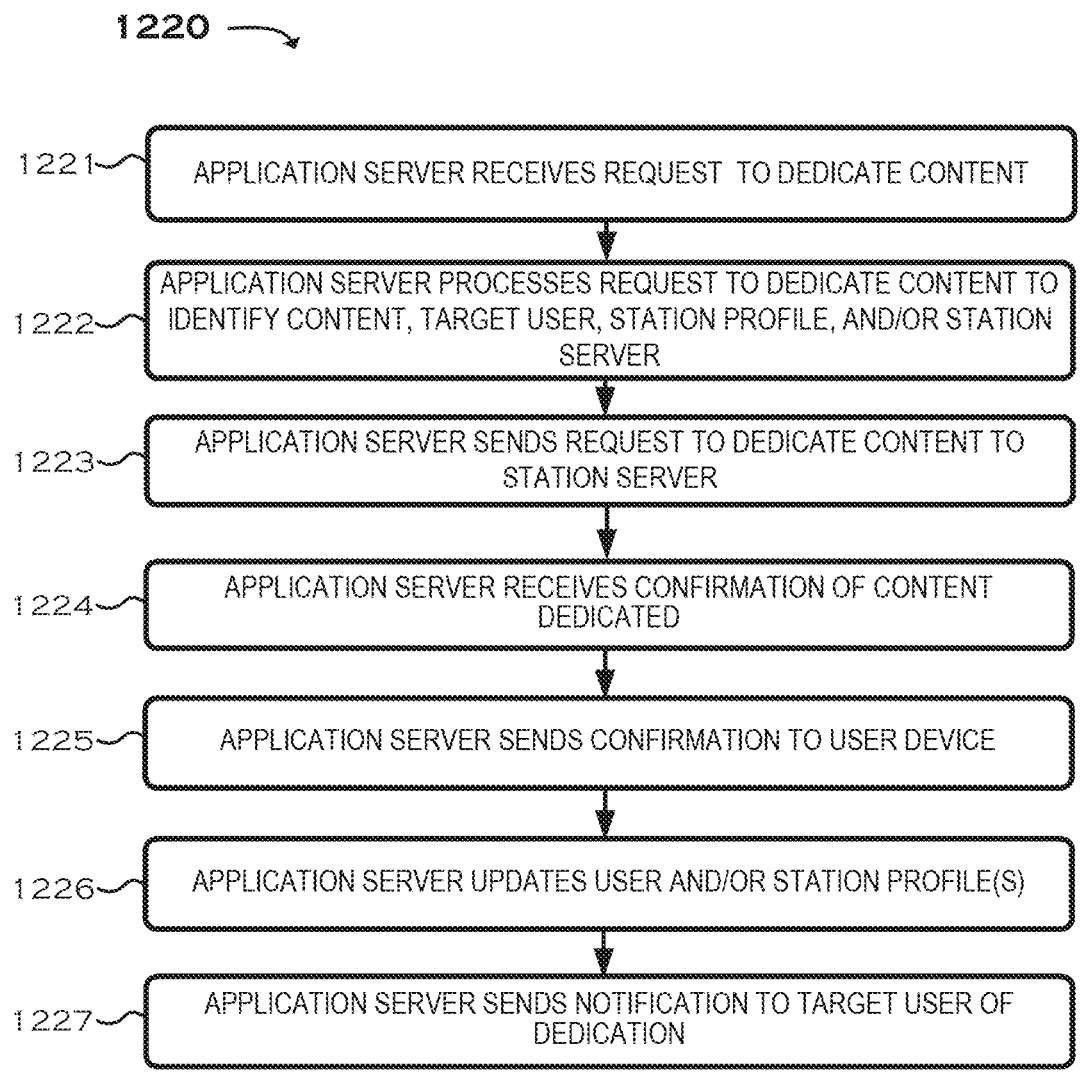
FIG. 12B is a flow chart of an example process by which an application server may enable the dedication of content according to an implementation described herein.

FIG. 12B is a flow chart of an example process 1220 by which application server 160 may enable the dedication of content. Application server 160 may receive, from a first user device associated with a first user, a request to dedicate content to a target user and/or target user device (BLOCK 1221). The request to dedicate content may include information, as described above, that may enable application server 160 to identify a user profile associated with the user and/or user device 110, a station profile associated with broadcast station 150, a target user profile associated with a target user or target user device (e.g., 110) (e.g., MDN, etc.), an identity of the target user, and the content to be dedicated. Application server 160 may process the request to dedicate content to identify the content to be dedicated, the user profile associated with the target user and/or target user device, an identity of the target user, a station profile associated with broadcast station 150 and/or station server 120, in a manner similar to that described above with respect to FIG. 10 (BLOCK 1222).

Application server 160 may send a request to dedicate content to station server 120 (BLOCK 1223), which may include, for example, the identity of the target user, an identifier associated with the target user device, and/or the content identifier (and/or content and/or content information). Station server 120 may process the request and/or may dedicate the content according to the request (e.g., to cause broadcast station 150 to broadcast that the content is dedicated to the target user). In another non-limiting implementation, application server 160 may send an indicator and/or notification to station profile 160 indicating that content that is currently broadcasted and/or that is to be broadcasted in the future shall be dedicated to the target user. Station server 120 may access the station profile, process the indicator and/or notification, and communicate with broadcast station 150 to dedicate the content accordingly.

Station server 120 may send a confirmation to application server 160 indicating that the content has been dedicated according to the request. Application server 160 may receive the confirmation that the content has been dedicated (BLOCK 1224) and may send a confirmation that the content has been dedicated to user device 110 (BLOCK 1225). Additionally, or alternatively, application server 160 may update and/or modify a user profile and/or station profile to include information associated with the dedication (BLOCK 1226). Additionally, or alternatively, application server 160 may communicate with target user device (e.g., 110) to send a notification, alert, etc. indicating that content has been dedicated to the target user (BLOCK 1227).

Additionally, or alternatively, a first user may dedicate content to a target user device via network 180 and/or may cause a copy of the content to be available to a target user device. For example, first user device 110 may send a request to application server 160 to make content available to the target user device. The request may include a content identifier, an identifier associated with user device 110 (MDN, ESN, etc.), and an identifier associated with the user device of the target user (MDN, ESN. etc.) to enable application server 160 to identify the content, a user profile associated with the first user and/or user device 110, and a user profile associated with the target user and/or a target user device (in a manner similar to that described above).

Application server 160 may receive the request and process the request to identify the content, a user profile associated with the first user and/or user device 110, and a user profile associated with the target user and/or user device associated with the target user (in a manner similar to that described above). In a manner similar to that described above with respect to FIG. 10, application server 160 may send an indicator and/or notification to the user profile of the target user making the content available to the user device of the target user. Additionally, or alternatively, as described above, application server 160 may provide a key and/or a copy of the content to the user device associated with the target user. Application server 160 may update the user profile associated with the first user and/or user device 110 accordingly.

While series of blocks are identified with regard to FIGS. 12A and 12B, the order and/or timing of the blocks is not intended to be limiting and may be modified in other implementations. Further, non-dependent blocks may be performed concurrently, substantially concurrently, and/or in a different order. Additionally, or alternatively, in other implementations, process 1200 and/or 1220 may include additional steps, less steps, modified steps, and/or different steps than shown in FIGS. 12A and 12B. In other non-limiting implementations, processes similar to that of processes 1200 and/or 1220 may be used to enable a user to dedicate and/or send ad content to another user (e.g., via user of user input via a record button).

Figure 13:
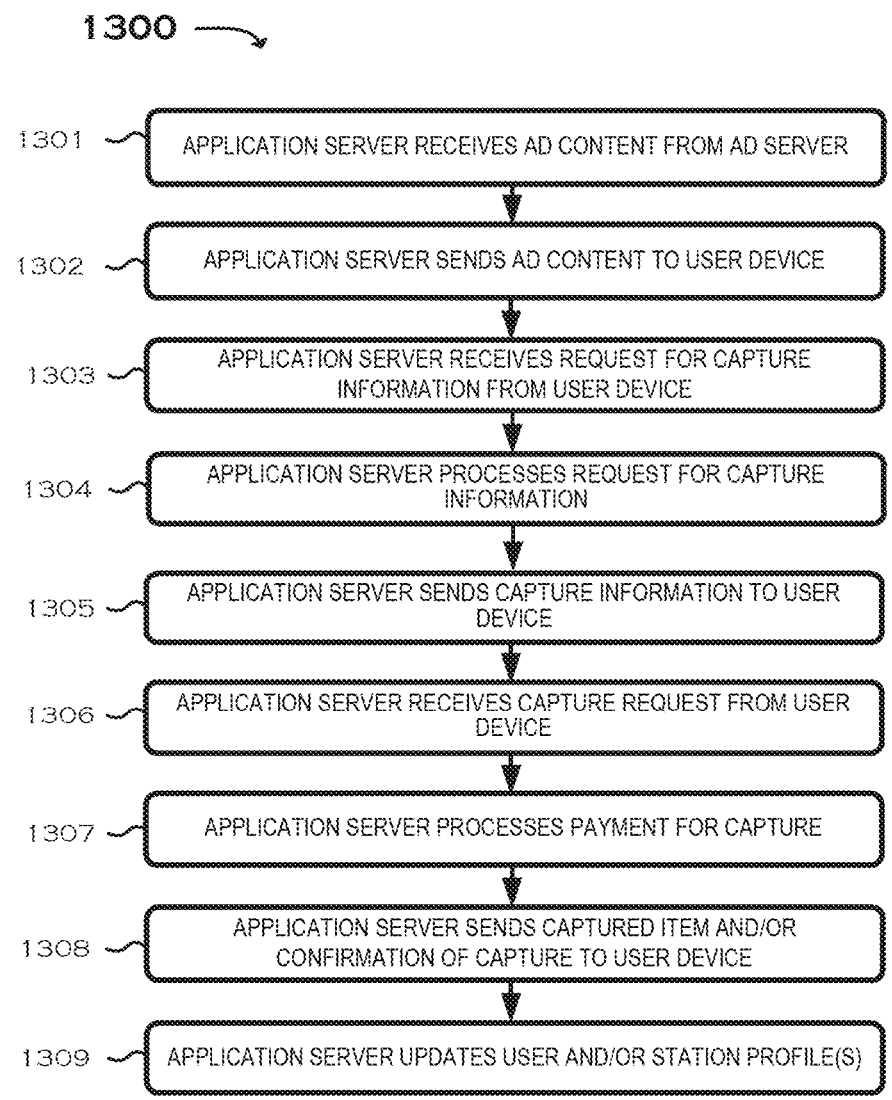
FIG. 13 is a flow chart of an example process by which a user of a user device may purchase items associated with ad content according to an implementation described herein.

FIG. 13 is a flow chart of an example process 1300 by which a user may capture items associated with ad content according to an implementation described herein. Application server 160 may receive ad content (e.g., an advertisement for tickets to an upcoming band concert) from ad server 170, station server 120, application server 160, and/or an entity server (as described herein) (BLOCK 1301) and may send the ad content to user device 110 (BLOCK 1302). For example, application server 160 may send ad content to user device 110 based on user profile information (e.g., preferred genres, ad history, purchase history, etc.). Station server 120 may send ad content to user device 110 based on, for example, content previously captured by user device 110 from a station profile associated with station server 120 and/or broadcast server 150, and/or proceeds associated therewith. User device 110 may receive the ad content and, in the event the user desires to capture an item advertised and/or otherwise associated with the ad content (e.g., tickets, etc.), the user may make an input to cause user device 110 to send a request for capture information (e.g., information associated with purchase, download, etc.) for the item advertised and/or otherwise with the ad content to application server 160. For example, a user may select capture button 904 (as shown in FIG. 9) to cause user device 110 to send a request for capture information for an item (e.g., tickets) to application server 160.

Application server 160 may receive the request for capture information from user device 110 (BLOCK 1303). Application server 160 may process the request to identify capture information associated with the items, which may include, for example, a charge (e.g., in award points, dollars, etc. including fees, taxes, etc.) for the items associated with the ad content (BLOCK 1304). Application server 160 may send the capture information to user device 110 (BLOCK 1305). Additionally, or alternatively, application server 160, content server 130, station server 120, and/or an entity server may send rewards (e.g., discounts, coupons, free content, etc.) to user device 110 and/or to make such rewards available through a user profile (in a manner similar to that described above). Rewards may be sent and/or made available, for example, in the event user device 110 interacts with ad content. User device 110 may receive the capture information and may display the capture information for a user to review. For example, user device 110 may display the items advertised and/or otherwise associated with the ad content (e.g., tickets), quantity of items (e.g., 1, 2, 3, 4, etc.), cost, taxes, fees, etc. In the event that a user desires to capture the items advertised and/or otherwise associated with the ad content, the user may make an input to cause user device 110 to send a capture request to application server 160. Application server 160 may receive a capture request from user device 110 (BLOCK 1306) and may process payment (e.g., money, award points, etc.) to capture the items advertised and/or otherwise associated with the ad content (BLOCK 1307). In the event that the captured items may be delivered electronically (e.g., electronic versions of tickets), application server 160 may send the captured items (e.g., in electronic format) to user device 110 (BLOCK 1308). In the event that the captured items cannot be delivered electronically (e.g., physical items, perishables, etc.), application server 160 may send a confirmation to user device 110 including confirmation of capture and information associated with the captured item (e.g., shipping information, tracking ID, delivery date, delivery address, etc.) (BLOCK 1308). Additionally, or alternatively, application server 160 may send a communication to ad server 170 and/or another server to request that the captured items be sent to the user (e.g., at an address included in a user profile, etc.) associated with the user.

Application server 160 may update the user's user profile (e.g., ad history 708, award points information 707, etc.) and/or a station profile (and/or an entity server, as described herein) (e.g., ad content information 804, etc.) to reflect the transaction (BLOCK 1309).

While series of blocks are identified with regard to FIG. 13, the order and/or timing of the blocks is not intended to be limiting and may be modified in other implementations. Further, non-dependent blocks may be performed concurrently, substantially concurrently, and/or in a different order. Additionally, or alternatively, in other implementations, process 1300 may include additional steps, less steps, modified steps, and/or different steps than shown in FIG. 13. For example, in one non-limiting implementation, user device 110 may receive ad content from ad server 170 and/or station server 120. Additionally, or alternatively, ad server 170 may send ad content to station server 120, which may receive the ad content and send the ad content to user device 110 (a process similar to process 1300 may follow thereon).

Figure 14:
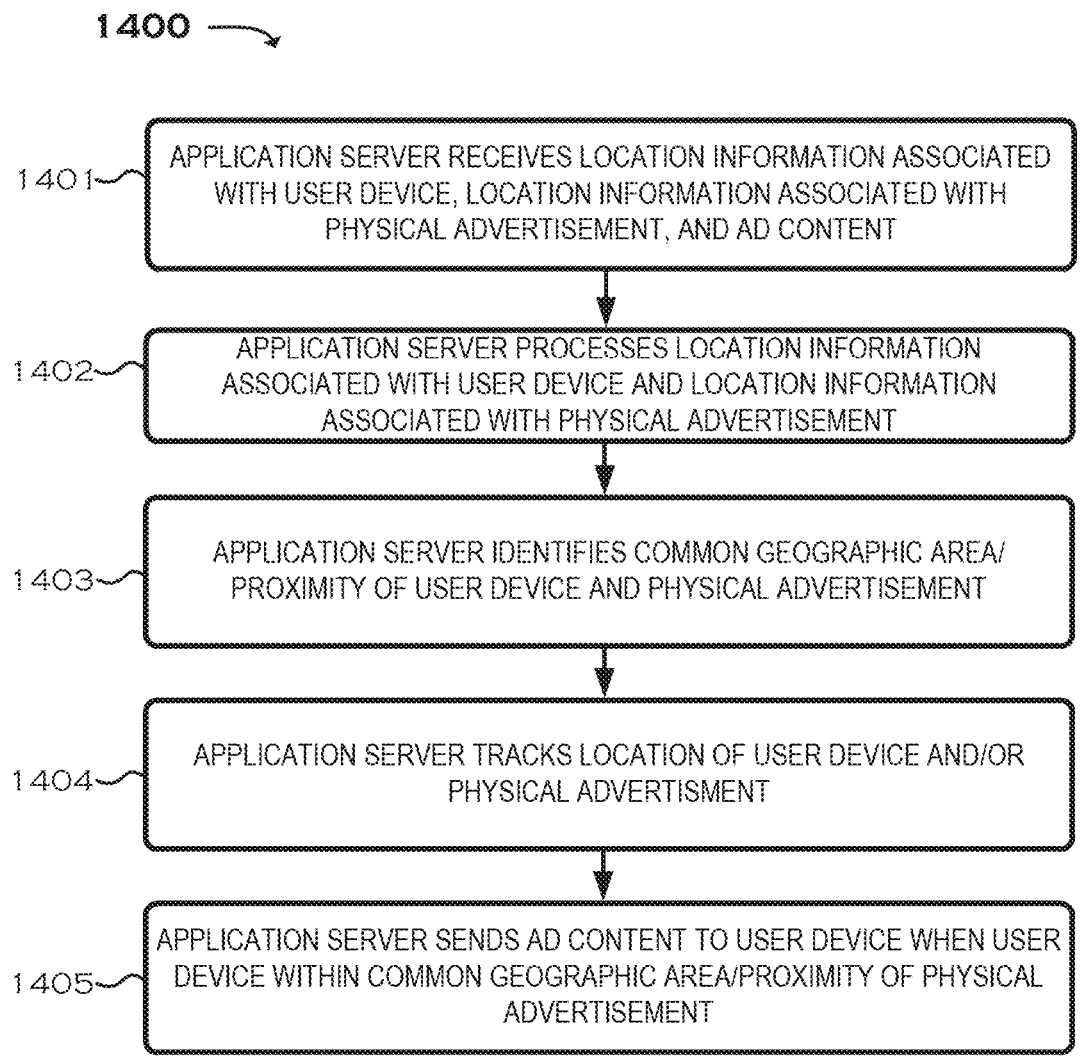
FIG. 14 is a flow chart of an example process by which an application server may send ad content based on the location of a user device and a physical advertisement according to an implementation described herein.

FIG. 14 is a flow chart of an example process 1400 by which application server 160 may send ad content based on the location of user device 110 and a physical advertisement according to an implementation described herein. An individual may encounter a physical advertisement (e.g., billboard, sign, banner, in-store advertisement, street advertisement, sale advertisement of real estate, etc.) that includes advertising of products and/or services, for example while the individual is traveling in an automobile. However, a user's interaction with the physical advertisement is often insufficient for the physical advertisement to impart its intended effect on the user. Ad server 170 may track, store, update, monitor, and/or maintain the location of a physical advertisement and/or ad content associated with the physical advertisement and ad server 170 may send location information and/or ad content associated with a physical advertisement to application server 160. Additionally, or alternatively, application server 160 may store (e.g., in database 165) a profile that includes information associated with a physical advertisement (e.g., location, associated ad content, date of ad content, etc.) that may be updated, changed, and/or modified. Additionally, or alternatively, application server 160 may enable user device 110 to access (e.g., via the use of profiles) ad content in a manner similar to that described above with respect to FIG. 10.

Application server 160 may receive location information associated with user device 110 (e.g., from user device 110 and/or some other device and/or server), location information associated with a physical advertisement, and/or ad content associated with the physical advertisement from ad server 170 (BLOCK 1401). For example, application server 160 may obtain ad content from a profile that includes information associated with the physical advertisement and/or receive information associated with the physical advertisement (e.g., location) from ad content server 170 and/or another server. Application server 160 may process the location information associated with user device 110, location information associated with the physical advertisement (BLOCK 1402) and may determine that user device 110 is in proximity of the physical advertisement (less than a distance threshold of 100 ft., 200 ft., 1000 ft., 1 mile, etc.), when the location of user device 110 converges on the location of the physical advertisement, and/or may identify a common geographic area (e.g., radial distance, linear distance, defined by coordinates, municipality, region, etc.) of user device 110 and the physical advertisement (BLOCK 1403). Application server 110 may track the location of user device 110 and/or the location of the physical advertisement (BLOCK 1404). For example, user device 110 may continuously generate and/or send location information associated with user device 110 to application server 160. Application server 160 may send ad content (associated with the physical advertisement) to user device 110, when application server 160 determines that user device 110 is within the common geographic area, in proximity of the physical advertisement (e.g., above, below, beyond, etc. a threshold), and/or converging coordinates with the physical advertisement (BLOCK 1405). User device 110 may display the ad content for a user to view. In this manner, a user may view the ad content associated with the physical advertisement in a time sufficient for the physical advertisement to impart its intended effect on the user. For example, user device 110 may be integrated into an automobile and process 1400 may allow a user additional time to view and/or interact with ad content that is associated with a physical advertisement (e.g. billboard). Additionally, or alternatively, a process similar to process 1400 may follow to enable the user to capture items associated with the ad content While series of blocks are identified with regard to FIG. 14, the order and/or timing of the blocks is not intended to be limiting and may be modified in other implementations. Further, non-dependent blocks may be performed concurrently, substantially concurrently, and/or in a different order. Additionally, or alternatively, in other implementations, process 1400 may include additional steps, less steps, modified steps, and/or different steps than shown in FIG. 14.

Figure 15:
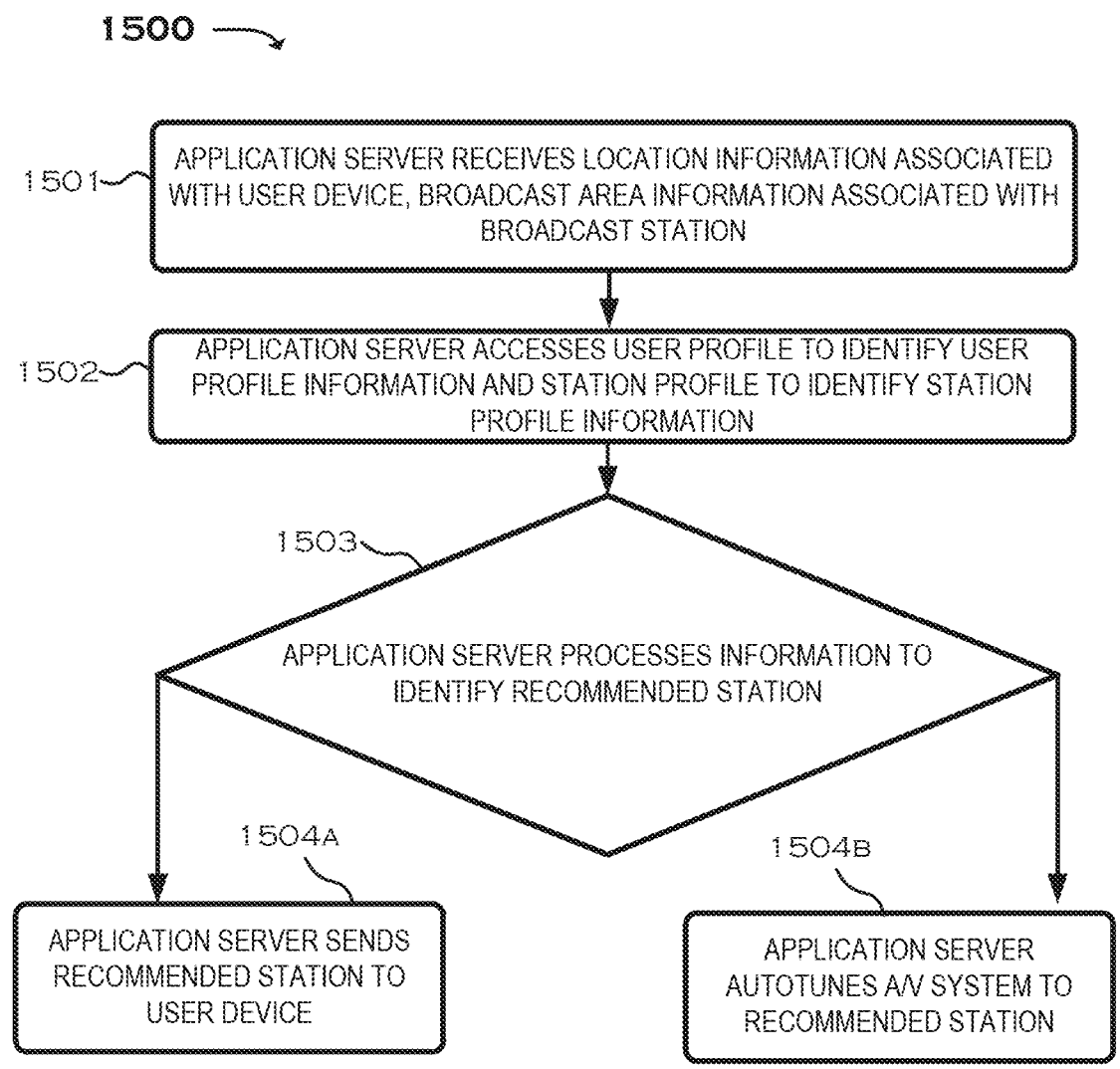
FIG. 15 is a flow chart of an example process by which an application server may recommend a broadcast station and/or autotune an audio video device according to an implementation described herein.

FIG. 15 is a flow chart of an example process 1500 by which application server 160 may recommend and/or autotune a broadcast station according to an implementation described herein. Application server 160 may receive location information associated with user device 110 and/or information associated with one or more broadcast station 150 (e.g., from station server 120) (BLOCK 1501). Additionally, or alternatively, application server 160 may access a user profile and/or a station profile to obtain information associated with user device 110 and/or information associated with the one or more broadcast station 150. Application server 160 may access a user profile to identify user profile information (e.g., preferred genres 703, listening history 705, content library 702, etc.) and/or one or more station profile to identify station profile information associated with the one or more broadcast station 150 (e.g., program information, genre, channel information, information identifying the broadcast area of the broadcast station, etc.) (BLOCK 1502). Application server 160 may process the location information associated with user device 110, the user profile information (e.g., preferred genres, etc.), and/or the station profile information (e.g., program information, genres, etc.) to identify a broadcast station that has a genre and/or content that is similar to and/or consistent with the user profile information (e.g., preferred genres, listening history, content library, etc.) (hereinafter, a "recommended station") (BLOCK 1503). Application server 160 may send a communication (e.g., text message, audio message, alert, email, etc.) to user device 110 identifying the recommended station and/or its associated genre, previous content, current content, future content and/or start times associated with the future content (BLOCK 1504A). Additionally, or alternatively, application server 160 may communicate with audio video device 140 to automatically adjust ("autotune") the station frequency and/or channel to that of the recommended station (1504B). In one non-limiting implementation, a user profile may specify if the user permits application server 160 to autotune to a particular station frequency and/or channel. Additionally, or alternatively, user device 110 and/or application server 160 may cause the audio video device 140 to change to a different broadcast station based on a determination that the different broadcast station is broadcasting content that corresponds to a preferred genre, title, etc. as reflected in the user profile. Additionally, or alternatively, user device 110 and/or application server 160 may cause the audio video device 140 to change from a live radio broadcast to a streaming broadcast in the event that the quality of the live radio broadcast deteriorates.

While series of blocks are identified with regard to FIG. 15, the order and/or timing of the blocks is not intended to be limiting and may be modified in other implementations. Further, non-dependent blocks may be performed concurrently, substantially concurrently, and/or in a different order. Additionally, or alternatively, in other implementations, process 1500 may include additional steps, less steps, modified steps, and/or different steps than shown in FIG. 15.

Figure 16:
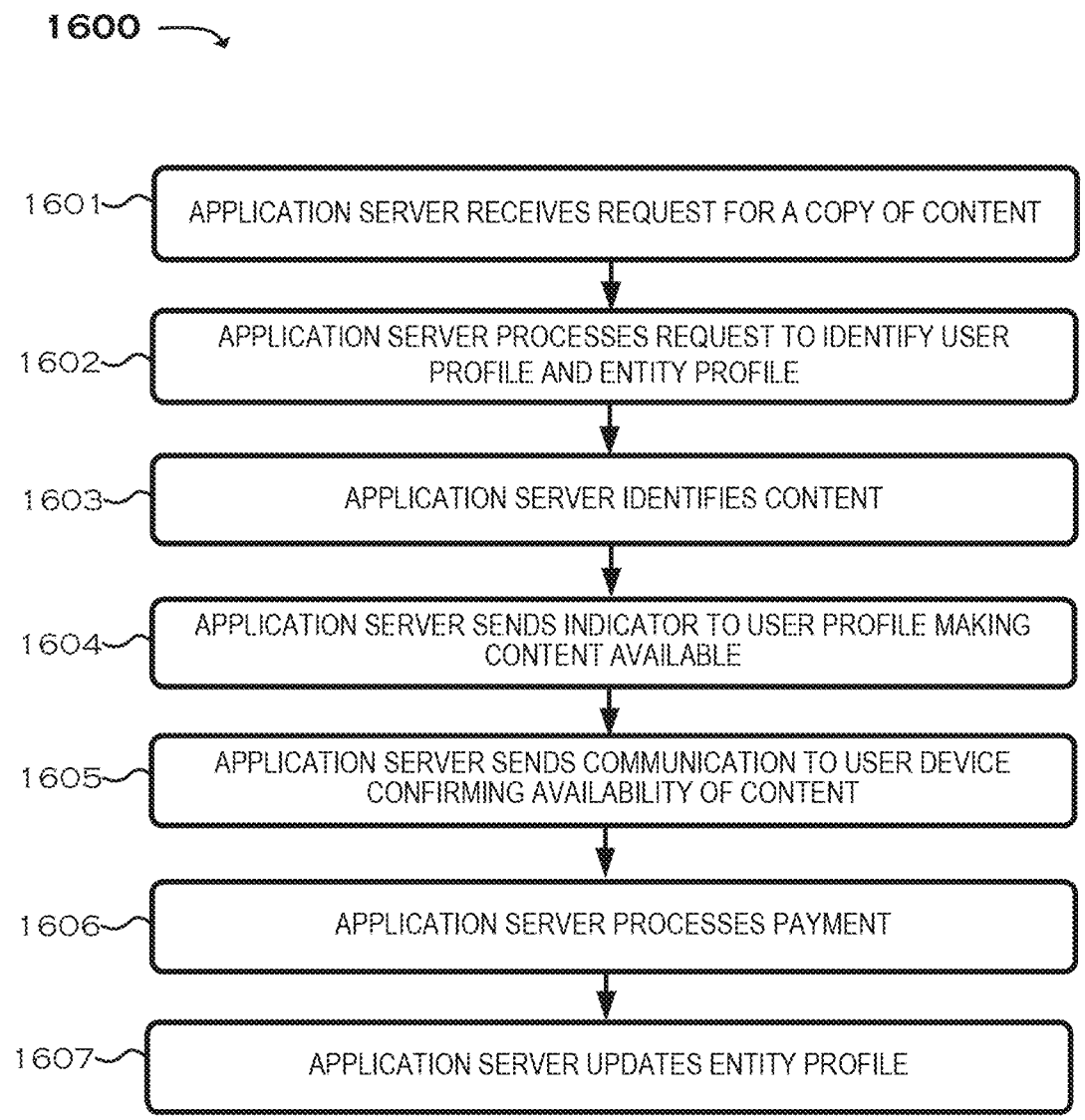
FIGS. 16 are flow charts of example processes by which an application server may provide content associated with an entity to a user device according to an implementation described herein.

FIG. 16 is a flow chart of an example processes 1600 by which application server 160 may provide content associated with an entity to a user according to an implementation described herein. User device 110 may be located within, adjacent, near, approximate to, etc. an entity (e.g., restaurant, night club, bar, lodging, hall, venue, and/or any establishment etc.) and/or artist/author (e.g., band, disc jockey, orchestra, symphony, chorus, and/or any other group or individual, etc.) that plays and/or transmits (e.g., from its library, from a broadcast station, etc.) content and/or is associated with content. As described herein, environment 100 may include a server associated with an entity and/or artist/author ("entity server") and the entity and/or artist may have a profile associated with the entity and/or artist (e.g., similar to station profile 800) ("entity profile"). User device 110 may capture content transmitted by, played by, and/or associated with the entity and/or artist/author. For example, in the event that a user desires to capture content (for example, because a user likes a song played in an entity), the user may cause user device 110 to send a request for content to application server 160 (e.g., via capture button 904).

As shown in FIG. 16, application server 160 may make the content available to user device 110 in a manner similar to that of process 1000. Application server 160 may receive a request for a copy of the content from user device 110 (BLOCK 1601). The request may include, for example, an identifier associated with user device 110 (e.g., MDN, ESN, etc.) that may enable application server 160 to identify a user profile associated with user device 110, a content identifier that may enable application server 160 to identify the content that is being requested, an identifier and/or information (e.g., name, location, address, telephone number, IP address, other identifier, etc.) that may enable application server 160 to identify an entity profile associated with the entity. The request may include any other information associated with the entity that may enable application server 160 to identify an entity profile associated with the entity, any other information associated with user device 110 that may enable application server 160 to identify a user profile associated with user device 110 and/or the user, and/or any other information or identifier that may enable application server 160 to identify the content that is requested. Additionally, or alternatively, a request for content may include location information associated with user device 110 to enable application server 160 to, for example, identify the entity in which the user device is located (e.g., by matching the location information associated with user device 110 to location information associated with an entity stored in an entity profile).

Application server 160 may process the request to identify a user profile associated with the user and/or user device 110 (in a manner similar to that described above with respect to FIG. 10) and to identify an entity profile associated with the entity (e.g., by matching the identifier and/or information associated with the entity included in the request to information stored the entity profile) (BLOCK 1602). Application server 160 may process the requested content to identify the requested content (BLOCK 1603), in a manner similar to that described above.

Application server 160 may send, to the user profile, an indicator and/or notification granting user device 110 (and/or any other device associated with the user) access and/or the ability to play the content (BLOCK 1604). In this way, application server 160 may make the content available to user device 110 and/or another device associated with the user for playing. Once the content is available, user device 110 may communicate with and/or access application server 160, content server 130, the entity server, and/or some other server, to play the content.

Additionally, or alternatively, application server 160 may obtain a key (e.g., from content server 130, entity server, etc.) that enables the content to be encrypted, decrypted, etc. and may send the key to user device 110, as described above. Additionally, or alternatively, application server 160 may send a copy of the content directly to user device 110 and/or may cause another device and/or server (e.g., content server 130, entity server) to send a copy of the content directly to user device 110.

Application server 160 (and/or another server) may send a communication to user device 110 confirming the availability of the content (BLOCK 1605). Application server 160 may process payment for the requested content (BLOCK 1606), in a manner similar to that described above. Application server 160 may provide payment proceeds to the entity server, content server 130, and/or any other server or device associated with a party that is entitled to receive a portion of the proceeds. Additionally, or alternatively, application server 160 may provide an invoice, bill, and/or payment confirmation to user device 110.

Application server 160 may update the entity profile associated with the entity to indicate that the content has been captured by user device 110 (BLOCK 1607), in a manner similar to that described above with respect to FIG. 10.

While series of blocks are identified with regard to FIG. 16, the order and/or timing of the blocks is not intended to be limiting and may be modified in other implementations. Further, non-dependent blocks may be performed concurrently, substantially concurrently, and/or in a different order. Additionally, or alternatively, in other implementations, process 1600 include additional steps, less steps, modified steps, and/or different steps than shown in FIG. 16. For example, in other non-limiting implementations, process 1600 may be used to capture an arrangement of content. Additionally, or alternatively, a process similar process 1100 may be used to capture an arrangement of content from an entity and/or entity profile. Additionally, or alternatively, in the event that an entity is playing content broadcast by broadcast station 150 (e.g., the entity includes an audio video device as described herein), user device 110 may receive content information from an entity server and a process similar to process 1000 and/or process 1600 may enable the capture of content.

Figure 17:
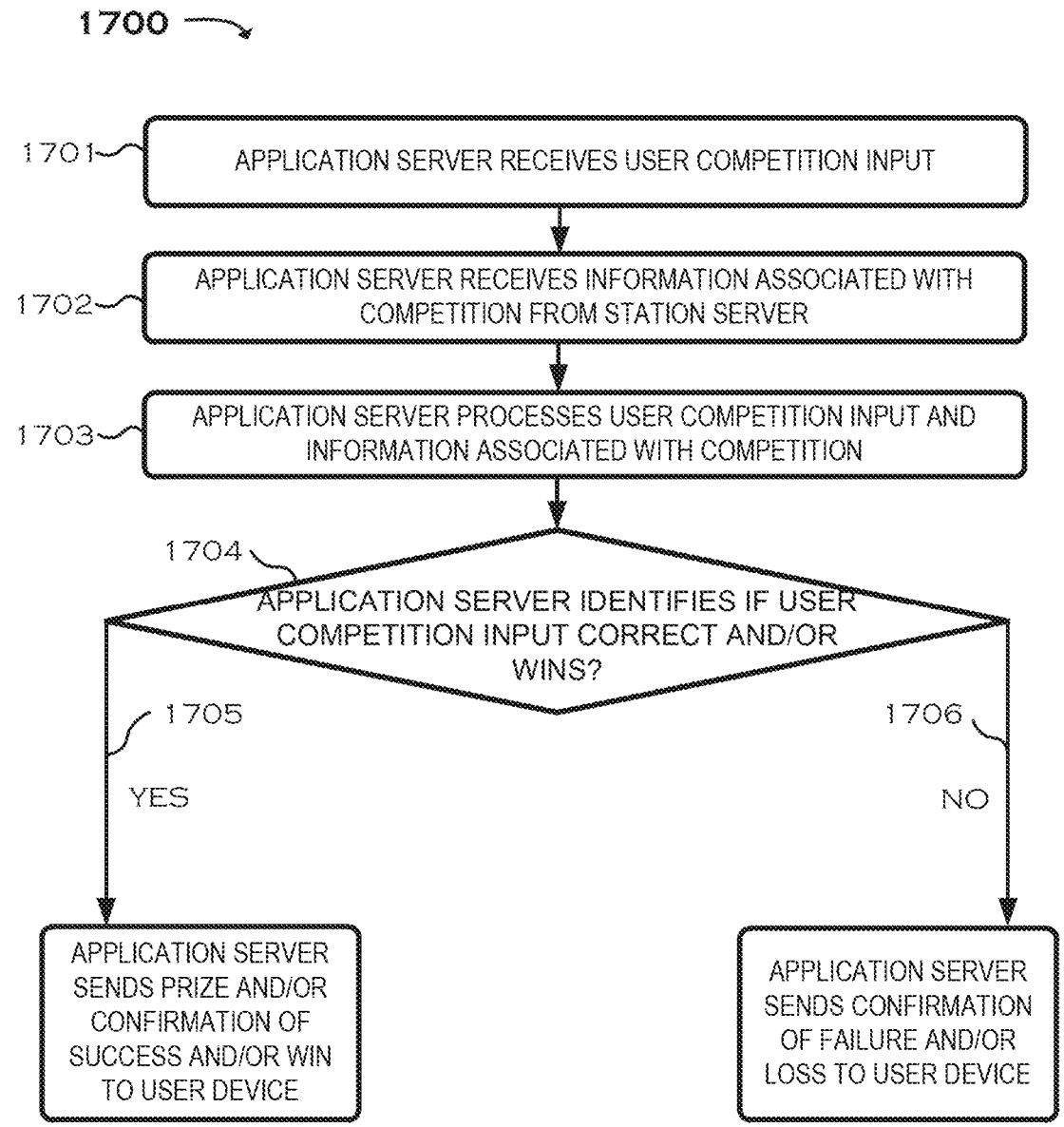
FIG. 17 is a flow chart of an example process by which an application server may enable a user device to participate in a competition according to an implementation described herein.

FIG. 17 is a flow chart of an example process 1700 by which application server 160 may enable a user to participate in a competition according to an implementation described herein. For example, broadcast station 150 may broadcast information associated with a competition (hereinafter, "competition information") that is received audio video device 140. Competition information may include, for example one or more question, game, quiz, puzzle, first-to-respond, certain number responder, etc. associated with a competition to win a prize, money, etc. that is broadcasted by broadcast station 150. Audio video device 140 may receive the competition information and may send the competition information to user device 110. User device 110 may receive the competition information and may display and/or audibly transmit the competition information for a user. In the event the user desires to participate in the competition, the user may provide a user input (e.g., via record button 905) responding to the competition (e.g., "user competition input") to user device 110. The user competition input may, for example, include a voice command and/or recording of the user responding to the competition. User device 100 may receive the user competition input and may send the user competition input to application server 160.

Application server 160 may receive the user competition input from user device 110 (BLOCK 1701) and may receive information associated with the competition (e.g., including the competition information) from station server 120 (BLOCK 1702) that may enable application server 160 to determine if user competition input is successful with respect to the competition. Application server 160 may process the user competition input and/or the information associated with the competition (BLOCK 1703) to identify whether the user competition input is correct and/or wins the competition (BLOCK 1704). If the user competition input is correct and/or wins the competition, application server 160 may send a prize (e.g., in the event the prize is deliverable in electronic version) and/or a confirmation of success and/or winning to user device 110 indicating that the user competition input was correct and/or won the competition (BLOCK 1705). Additionally, or alternatively, in the event that the prize may not be delivered electronically the application server 160 may cause (e.g., via communication with station server 120 and/or some other server) a prize to be sent to an address associated with a user (e.g., stored in the user profile associated with a user).

If the user competition input is not correct and/or fails to win the competition, application server 160 may send a confirmation of failure and/or loss to user device 110 indicating that the user competition input was incorrect and/or failed to win the competition (BLOCK 1706). Application server 160 may update a user profile associated with a user and/or station profile associated with broadcast station 150 to indicate participation in the competition by the user and/or user device 110 and/or user device 110 was successful.

While series of blocks are identified with regard to FIG. 17, the order and/or timing of the blocks is not intended to be limiting and may be modified in other implementations. Further, non-dependent blocks may be performed concurrently, substantially concurrently, and/or in a different order. Additionally, or alternatively, in other implementations, process 1700 may include additional steps, less steps, modified steps, and/or different steps than shown in FIG. 17. For example, another server within environment 100 (e.g., application server 160, station server 120, content server 130, ad server 170, etc.) may also, or alternatively, provide competition information to user device 110. Additionally, or alternatively, a user interface may have a button to contact (e.g., test, call, email, etc.) station server 120 and/or broadcast server 150.

Additionally, or alternatively, application server 160 may provide analytics to station server 120, content server 130, ad server 170, and/or another device and/or server within environment 100 (e.g., a device and/or server associated with an artist, author, recording studio, and/or other holder of rights to the content), based on a quantity and/or frequency of content, ad content, competitions, etc. captured and/or participated in and/or the revenue associated therewith. As described herein, application server 160 may monitor and/or track the number of audio video devices transmitting a particular broadcast station and/or content, the content captured by user device 110, and/or the competitions participated in by user device 110. Additionally, or alternatively, application server 160 may monitor and/or track the ad content sent to user device 110 and/or ad content associated with items captured by user device 110. Application server 160 may store the tracked and/or monitored information in a station profile, user profile, and/or a profile associated with any other server and/or device to enable a broadcast station to monitor (e.g., in real-time) the analytics and any other statistical data associated with the broadcast station, capture of content, competition participation, and/or ad content, for example, during a broadcast.

Figure 18:
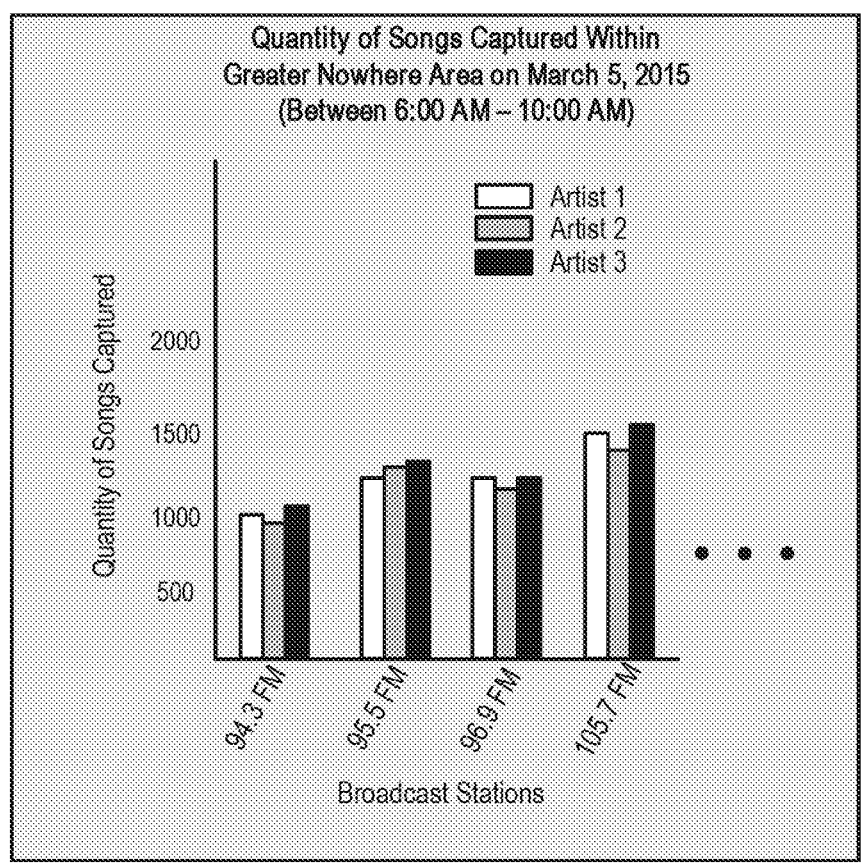
FIG. 18 is a diagram of an example graphic illustrating analytics that an application server may provide according to an implementation described herein.

In one non-limiting example (as shown in FIG. 18) application server 160 may provide analytics to station server 120 showing the quantity of content associated with one or more broadcast station that has been captured by user devices 110. The analytics may be relative to geographic area, market, user demographics, time periods, artist/authors, etc. Additionally, or alternatively, the analytics may identify the content title, genre, time captured, amount of revenue associated with the capture of the content, information associated with the user(s) that captured the content, etc. Additionally, or alternatively, application server 160 may compare the analytics of one or more broadcast stations (e.g., within a proximity, a market, a demographic, etc. with which the particular broadcast station is associated) and may provide such analytics to a particular broadcast station to enable the particular broadcast station to be compared with the other broadcast stations.

Figure 19:
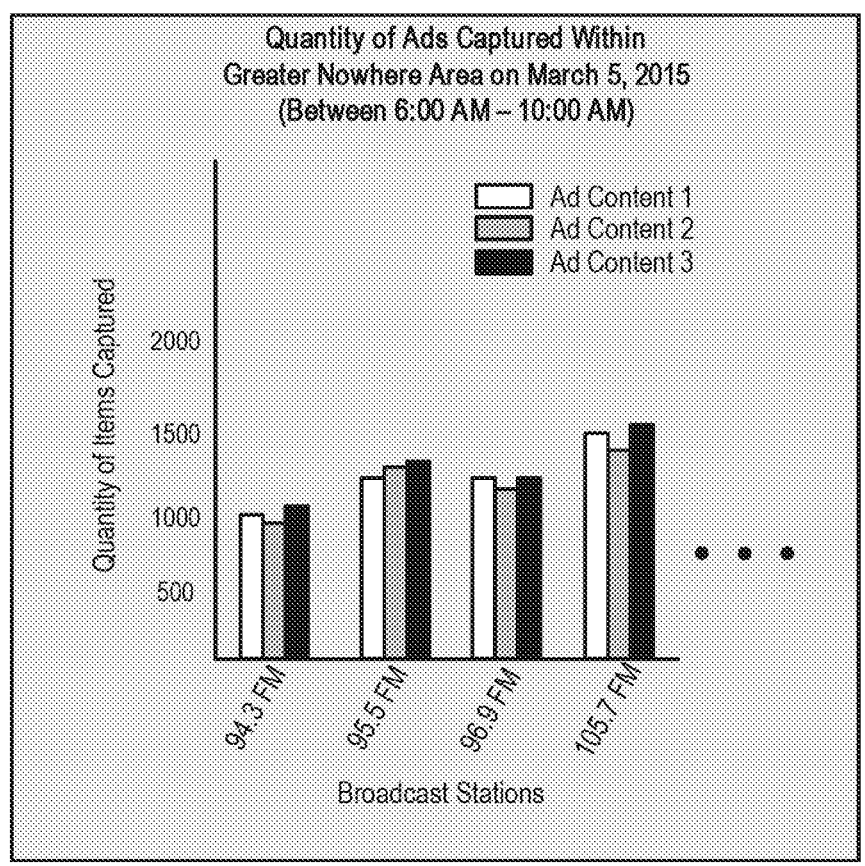
FIG. 19 is a diagram of another example graphic illustrating analytics that an application server may provide according to an implementation described herein.

The types, organization, orientation, configuration, and/or layout of information shown in FIG. 18 is not intended to be limiting and may be modified in other implementations. Additionally, or alternatively, in other implementations, analytics may include additional information, less information, modified information, and/or different information than shown in FIG. 18. Additionally, or alternatively, application server 160 may send analytics (e.g., as shown in FIG. 19) to ad content server 170.

The foregoing description provides illustration and description, but is not intended to be exhaustive or to limit the implementations to the precise form disclosed. Modifications and variations are possible in light of the above teachings or may be acquired from practice of the embodiments.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code--it being understood that software and control hardware can be designed to implement the systems and methods based on the description herein.

Further, certain portions, described above, may be implemented as a component or logic that performs one or more functions. A component or logic, as used herein, may include hardware, such as a processor, an ASIC, or a FPGA, or a combination of hardware and software (e.g., a processor executing software).

It should be emphasized that the terms comprises and comprising, when used in this specification, are taken to specify the presence of stated features, integers, steps or components but do not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A server device that communicates with a user device associated with a user, where the user device receives content information that describes content that is broadcasted by an entity server, the server device comprising:
   one or more processors executing instructions to:
      receive, from the user device, a request for a copy of the content, the request including a first identifier associated with the content, information associated with the user device, and information associated with the entity server;
      obtain a user profile associated with the user device by matching the information associated with the user device to first information stored in the user profile;
      obtain an entity profile, associated with the entity server, by matching the information associated with the entity server to second information stored in the entity profile;
      identify the content, in the entity profile, by matching the first identifier to a second identifier associated with the content stored in the entity profile;
      obtain the copy of the content to enable the user device to access the copy of the content based on the identifying the content in the entity profile; and
      send, to the user profile, a notification indicating that the user device is authorized to access to the content.

2. The server device of claim 1, where the information associated with the entity server identifies an entity that corresponds to a restaurant, night club, bar, hotel, hall, establishment, event venue, individual or group of individuals.

3. The server device of claim 2, further including a second entity server, where the information associated with the entity server includes location information stored in the entity profile, where the information associated with the user device includes location information associated with the user device, and
   where the one or more processes are further to:
      process the location information stored in the entity profile, and the location information associated with the user device and location information associated with a second entity, associated with the second entity server, to differentiate between the content broadcast by the entity server and second content broadcast by the second entity server.

4. The server device of claim 1, where the one or more processors are further to:
identify a portion of a payment to be provided to the entity server as a result of the user device receiving access to the content; and
update the entity profile to include an indicator that the user device has been granted access to the content, the information associated with the user device, and information identifying the portion of the payment to be provided to the entity server as a result of the user device receiving access to the content.

5. The server device of claim 1, where the request for a copy of the content corresponds to a voice command.

6. The server device of claim 1, where the content is encoded and where the one or more processors are further to:
obtain a key that enabled the content to be encoded;
generate the notification in a manner that includes the key;
receive, from the user device, the request for the copy of the content, the request including a key;
process the copy of the content using the key to decode the copy of the content; and
transmit the decoded copy of the content to the user device.

7. The server device of claim 1, where the one or more processors are further to:
generate the notification in a manner that includes an authorization code;
receive, from the user device, a request to access the copy of the content, the request including another authorization code; and
send the copy of the content to the user device when the authorization code matches the another authorization code.

8. The server device of claim 1, where the one or more processors are further to:
receive, from the user device, a request to dedicate the content to a target user, the request including an identity of the target user, the information associated with the user device, information associated with a target user device, the identifier associated with the content, and the information associated with the entity server;
process the request to dedicate the content to obtain the user profile, a target user profile associated with the target user device, the content and the entity profile;
send to the entity server a communication that requests the content be dedicated, the communication including at least the identity of the target user and the identifier associated with the content; and
send, to the target user device, a second notification identifying the dedicated content and an identity of the user associated with the user device, stored in the user profile, that sent the request to dedicate content.

9. The user device of claim 1, where the one or more processors are further to:
receive, from the user device, a response to a competition previously broadcasted by the entity server and the information associated with the entity server;
identify, based on the information associated with the entity server, a second server device associated with the entity server;
receive, from the second server device, information associated with the competition;
process the response and the information associated with the competition to identify whether the response is successful with respect to the competition; and
send, to the user device a prize or confirmation of success when the response is successful with respect to the competition, or
a confirmation of failure when the response is not successful with respect to the competition.

10. The server device of claim 1, where the one or more processors are further to:
receive information associated with a location of the user device;
obtain, from the user profile, information that identifies a preference of the user;
receive, from a second entity server, information associated with second entity server;
process the information associated with the location of the user device, the preference of the user, the information associated with the entity server and the information associated with second entity server to identify a recommended content, from the content or from a second content from the second entity server, and
send, to the user device, information associated with the recommended content.

11. The server device of claim 1, where the one or more processors are further to:
receive, from the entity server, ad content that advertises one or more item;
broadcast the ad content;
receive, from the user device, a request for information associated with the purchase of the one or more item advertised by the ad content;
process the request for information associated with the purchase of the one or more items advertised by the ad content;
send, to the user device, information associated with the purchase of the one or more item advertised in the ad content;
receive, from the user device, a request to purchase the one or more item advertised in the ad content;
process payment information stored in the user profile to purchase the one or more item advertised in the ad content;
send, to the user device, the purchased one or more item or a confirmation confirming the purchase of the one or more item advertised in the ad content; and
update the user profile to reflect the purchase of the one or more item advertised in the ad content.

12. The server device of claim 1, where the first identifier corresponds to location information associated with the user device.

13. The server device of claim 1, where the one or more processors are further to:
receive information associated with a location of the user device;
receive, from the entity server, information associated with a location of a physical advertisement and ad content associated with the physical advertisement;
process the information associated with the location of the user device and the information associated with the location of the physical advertisement to determine whether a distance, between the user device and the physical advertisement, is less than a threshold; and
send, to the user device, the ad content, associated with the physical advertisement, when the distance is less than the threshold.

14. The server device of claim 1, where the user device is integrated into an automobile.

15. A method performed by a server device, executing one or more instructions, that communicates with a user device associated with a user, where the user device receives content information associated with content that is broadcasted by an entity server, the method comprising:
  receiving, by the server device and from the user device, a request for a copy of the content, the request including:
    a first identifier associated with the content, information associated with the user device, and information associated with the entity server;
  obtaining, by the server device, a user profile, associated with the user device, by matching the information associated with the user device to first information stored in the user profile;
  obtaining, by the server device, an entity profile, associated with the entity server, by matching the information associated with the entity server to second information stored in the entity profile;
  identifying, by the server device, the content, in the entity profile, by matching the first identifier to a second identifier, associated with the content stored in the entity profile;
  obtaining, by the entity server, the copy of the content to enable the user device to access the copy of the content based on the identifying the content in the entity profile; and
  sending, by the server device to the user profile, a notification indicating that the user device is authorized to access to the content.

16. The method of claim 15, where the information associated with the user device includes at least one of a MDN, serial number, brand associated with the user device, or type associated with the user device.

17. The method of claim 15, further including a second entity server and where the information associated with the entity server includes location information for an entity, associated with the entity profile, and the information associated with the user device includes location information associated with the user device, and the method further comprises processing, by the server device, location information for the entity, the location information associated with the user device, and location information associated with a second entity, associated with the second entity server, to differentiate between the content from the entity server and second content from the second entity server.

18. The method of claim 15 where the user device is integrated into an automobile.

19. The method of claim 15 where the first identifier corresponds to location information of the user device.

20. A system comprising:
  one or more user devices, executing one or more instructions to:
    receive content information associated with content broadcasted by an entity server;
  one or more server devices, executing instructions, to:
    receive, from the user device, a request for a copy of the content, the request including a first identifier associated with the content, information associated with the user device, and information associated with the entity server;
    obtain a user profile associated with the user device by matching the information associated with the user device to first information stored in the user profile;
    obtain an entity profile, associated with the entity server, by matching the information associated with the entity server to second information stored in the entity profile;
    identify the content, in the entity profile, by matching the first identifier to a second identifier, associated with the content stored in the entity profile;
    obtain the copy of the content to enable the user device to access the copy of the content based on the identifying the content in the entity profile; and
    send, to the user profile, a notification indicating that the user device is authorized to access to the content.

21. The system of claim 20, where the user device is integrated into an automobile.

22. The system of claim 20, where the first identifier is location information associated with the user device.

23. A server device that communicates with a user device associated with a user, the server device comprising:
  one or more processors executing instructions to:
    receive, from the user device, a request to access audio content associated with an entity server, the request including information associated with the user device and information associated with the entity server, the audio content being currently broadcasted by the entity server, previously broadcasted by the entity server, or to be broadcasted by the entity server in the future;
    obtain a user profile, associated with the user device, by matching the information associated with the user device to first information stored in the user profile;
    obtain an entity profile, associated with the entity server, by matching the information associated with the entity server to second information stored in the entity profile;
    grant the user device access to the content;
    receive a request from the user device that includes a first identifier associated with the audio content;
    identify the audio content, in the entity profile, by matching the first identifier to a second identifier stored in the entity profile;
    send to the user profile a notification that the user device is authorized to access the audio content.

24. The server device of claim 23, where the first identifier corresponds to location information associated with the user device.

25. The server device of claim 23, where the user device is integrated into an automobile and the request is a voice command.

* * * * *